US005228123A

United States Patent [19]

Heckel

[11] Patent Number: 5,228,123

[45] Date of Patent: Jul. 13, 1993

[54] INTERFACE AND APPLICATION DEVELOPMENT MANAGEMENT SYSTEM BASED ON A GENE METAPHOR

[76] Inventor: Paul C. Heckel, 666 El Monte Ave. #10, Los Altos, Calif. 94022

[21] Appl. No.: 827,932

[22] Filed: Jan. 29, 1992

Related U.S. Application Data

[63] Continuation of Ser. No. 461,016, Jan. 4, 1990, abandoned.

[51] Int. Cl.[5] .............................................. G06F 3/14

[52] U.S. Cl. .................................... 395/155; 395/159

[58] Field of Search ................................ 395/155-161; 340/721, 747

[56] References Cited

U.S. PATENT DOCUMENTS 4,692,858 9/1987 Redford et al. ................ 395/156 X
4,794,386 12/1988 Bedrij et al. .................... 395/157 X
4,813,013 3/1989 Dunn ............................. 395/156 X

*Primary Examiner*—Heather R. Herndon

*Attorney, Agent, or Firm*—Merchant, Gould, Smith, Edell, Welter & Schmidt

[57] ABSTRACT

A system for compiling and managing screen images on a stack or data base with attached fields, and application program objects. The system lets users compile programs from screen images and their attached objects, which if executed after the screen image and object parameters have been changed, will translate the same screen image with the same objects attached in the same places. This allows maintaining multiple formats each with different application for the same stack. The system can be used to (a) edit screen formats in the program's script language, (b) manage alternative user interfaces for a data base or stack, (c) provide multiple formats and application interfaces for the same data base, (d) have multiple user interfaces for the same data base depending on users sophistication, (e) solve the system update installation problem, and (f) allow copying user interface including functional capability from one stack and installing it in another.

20 Claims, 17 Drawing Sheets

|  | NAME | COMPANY | PHONE |
|---|---|---|---|
|  | Mr. Tom Polhaus | Police Dept | 555-0033 |

TITLE: Detective Sargent
ADDRESS1: Hall of Justice
ADDRESS2: San Francisco, CA          95086
DEARNAME: Dear Tom

NOTES

Tom Polhous is a detective in the Maltese Falcon.
The movie starred Humphery Bogart and Mary Aster was directed
by John Huston.

| | 50v | 52v | | 74v |
|---|---|---|---|---|
| NAME | COMPANY | PHONE | | |
| Mr. Tom Polhaus | Police Dept | 555-0033 | | 🎩 —74v |
| 56v — TITLE: | Detective Sargent | | | |
| 58v — ADDRESS 1: | Hall of Justice | | 95086 | —62v |
| 60v — ADDRESS2: | San Francisco, CA | | | |
| 64v — DEARNAME: | Dear Tom | | Valid SS No? | —81v |
| SOC SEC NO: | | —79v | | |

NOTES —66v

Tom Polhous is a detective in the Maltese Falcon.
The movie starred Humphery Bogart and Mary Aster was directed by John Huston.

⬅ ▒▒▒ ➡

➡ —70v

INTERFACE AND APPLICATION DEVELOPMENT MANAGEMENT SYSTEM BASED ON A GENE METAPHOR

This is a continuation of Ser. No. 07/461,016, filed on Jan. 4, 1990, now abandoned.

BACKGROUND OF THE INVENTION

An important aspect of making computers powerful is to make it easy for users and application developers to make new and custom applications. A conceptual model that supports this and necessary display mechanisms was described in two prior patents U.S. Pat. No. 4,486,857 and U.S. Pat. No. 4,736,308. The inventions described therein are implemented in a program called Zoomracks. Zoomracks is a trademark of Quickview Systems and is available from Quickview Systems at 146 Main Street, Los Altos, CA. 94022. U.S. Pat. No. 4,486,857 describes a system that displays portions of a record, truncating the fields to fit the screen size. In particular the records, which may be referred to as screens or cards, each may contain multiple fields where the fields are truncated so an entire card can be viewed on the screen at once with only parts of individual fields showing. Typically there would be several cards (or records) in a stack (or file). There is a mechanism to select and zoom any individual field to show it in its entirely even if it is longer then the whole screen.

U.S. Pat. No. 4,736,308 is an improvement that allows the user to view portions of many such cards and lets users organize and view their cards in overlayed groups or stacks so that they appear to be in racks like time cards at at time clock. While not described in the patents, the Zoomracks program allows users to create macros and do simple programming which, combined with the patented technology, enables users to do a wide variety of applications. The invention described herein builds on the inventions described in U.S. Pat. Nos. 4,486,857 and 4,736,308.

Most data base programs are based on computer concepts of computer files and records and are designed for keeping information and creating reports. More sophisticated data base management programs are relational in that they permit the user to relate two or more separate files that have a common field in each of the various records.

HyperCard, which is available from Apple Computer, Inc, 20525 Mariani Ave, Cupertino, CA., 95014, uses concepts in U.S. Pat. No. 4,486,857. HyperCard is a trademark of Apple Computer. Zoomracks and HyperCard approach data bases differently from conventional data bases. They are designed as flexible platforms that support multiple applications within a common metaphor. The variety of applications they support are much wider than conventional data base applications and include word processing, hypertext and a variety of other applications not normally addressed by data base programs. The new approach brings the familiarity of index cards in stacks and racks, where a rack or stack is analogous to a file, along with the power to store large amounts of information in fields and zoom and scroll it.

HyperCard advanced the state of the art over Zoomracks. The invention described herein is an advance over HyperCard. Since the system described here is implemented on HyperCard which is widely available, the focus of the description is its use with HyperCard, although the invention is not so limited and could be used with other data bases. HyperCard is based on the metaphor of (index) cards in stacks where the user is able to see a single card at a time. Each screen consists of a background with is common for all cards in the stack and a card portion which is different for each card. Both the card and background portion consist of layers, like the a layers of transparencies used to create animated movies. The bottom background layer contains a visual image which can be created with HyperCard's paint commands. Each higher background layer contains a single object comprising either a field with text information or a "button" with a name, image or both that, when activated, executes an application program or "script" associated with the button and is written in a proprietary Apple language called HyperTalk. HyperTalk is a trademark of Apple Computer. HyperTalk is an object oriented programming language consisting of modules that are called "handlers" which are similar to subroutines in function. While these buttons and fields can overlay parts or all of buttons or fields on lower transparencies, usually fields and buttons do not overlap each other unless the are zoomed.

On top of the background layers are placed a similar set of layers for each card in a particular stack. While a card can have as many or more buttons and fields as a stack background does, it often has no buttons or fields. As the user goes from one card to another, the card portion changes but the background portion stays the same. A background field is a special case in that its contents (text) changes but its form (location, size, style) stays the same.

The fields and buttons are objects that are attached on the cards and backgrounds in layers, have properties or attributes most of which specify how they look. Object, button, field and property are terms of art which have technical meanings; however, the use of such terms is for illustration purposes only and does not limit the scope of this invention. Fields and button properties include style (opaque, rectangle, scrolling, or transparent), width (measured in pixels or number of dots), height(pixels), top(pixels), and left (pixels), textfont (Geneva, Helvetica), teststyle (bold, plain, italic), and textsize (pixels). Changing a property changes how the field or button is displayed on the screen. Thus changing a text style from bold to italic displays the same text for that object in italic rather than bold, or changing height changes the height of the object. Most properties can be changed graphically with HyperCard commands; all properties can be changed by a single HyperTalk programming language statement. An important property is "visible" which specifies whether or not an object is visible on the screen.

In essence a HyperCard stack is an application with the data provided in the fields and the functional capability provided in the "button" scripts. The applications are modularly segmented into button scripts. To execute a function the user selects the appropriate button and executes it. Typically, a button has a graphic icon although it may use a text name. Buttons, which were known before HyperCard, provide an alternative to menus, commands, or macros as a mechanism for initiating actions.

Users and developers can build applications by putting objects on the backgrounds and can modify the applications by changing the objects properties and scripts. HyperCard makes it easier for people to develop and prototype applications and try out different user interfaces.

HyperCard and other current technologies provide a framework in which users can develop and modify programs if they are reasonably straightforward. However, richer and more complicated applications that consist of functions (or tools) have potential interactions that grow exponentially in their complexity and are thus more difficult to develop and maintain. It normally requires an experienced programmer to create and modify such programs. This invention provides a framework which lets developers and users organize applications into fields and buttons and provides a mechanism to manage the user interface formats that these applications present on the screen. The invention brings new power to both experienced and inexperienced programmers alike in that they can develop, modify, and upgrade more sophisticated applications.

Computers programs that are based on metaphors have proven useful as being easier to understand and use. The spreadsheet metaphor popularized by VisiCalc and the desktop metaphor invented by Xerox and popularized on the Macintosh are examples of these. The invention described here is largely based on the metaphor of genes. Genes which are the basis of all life have the following similarities to the metaphor described:

(a) they encode form(at) information, (b) they encode information efficiently in that a small change can have global effects, (c) they can be cloned to create copies of themselves, (d) they can be translating or turned on which causes a specific form(at) (in the case of living genes, protein) to be constructed from existing elements (objects or amino acids).

(e) The information encoded can continue to evolve supporting more complex form(at)s. New information can be added to a genome without interfering with the existing genes. They support an evolutionary rather than a revolutionary approach to design change.

(f) They allow the transmission of of genetic information from one organism to another (conjugation) and the creation of descendant organisms which contain genetic information from two parents.

(g) Genetic engineering allows changing a gene's encoding to change the resulting form(at), (h) Recombination is inserting genetic information from one organism into another.

The last two of the above processes are artificial, the rest are natural. All of these processes are supported by analogy in the invention described here.

SUMMARY OF THE INVENTION

In an interactive display system which includes a data entry display screen, an input device, a processor, and a data storage device; is a program to control the visual display or format of at least one or more objects on one or more screens where the objects have defined properties. The program includes specifications for defining object properties both as they exist on the screen and in a computer language or other form. It includes a translator to convert the object properties specifications associated with the at least one object in the at least one screen into specifications in the computer language or second form called a gene script. It also includes the ability to translate the specifications of one or more objects from the gene script back to the visual screen image. It includes the ability to manage multiple gene scripts specifying different formats for the same stack, the ability to edit formats as gene scripts, and the ability to selectively translate the gene into the screen format whose objects properties are specified by a gene script. Finally it includes the ability to copy or port gene scripts from one stack to another and inject part or all of the ported format to the new stack.

BRIEF DESCRIPTION OF THE DRAWINGS

The foregoing and other uses of this invention, its various features thereof, as well as the invention itself may be better understood from the following description, when read together with the accompanying drawings.

FIG. *2a* shows the name and address format for stack A with only visible objects showing.

FIG. *2b* shows shows the FIG. *2a* format with invisible objects also showing.

FIG. *2c* shows shows FIG. *2a* with 4 gene buttons displayed.

FIG. 2i d shows the background graphic for the format shown in FIG. *2a*

FIG. *3a* shows a print label format for stack A with only visible objects showing.

FIG. *3b* shows shows the FIG. *3a* format with invisible objects also showing.

FIG. *4a* shows a mail merge format for stack A with only visible objects showing.

FIG. *4b* shows shows the FIG. *4a* format with invisible objects also showing.

Figure 5:
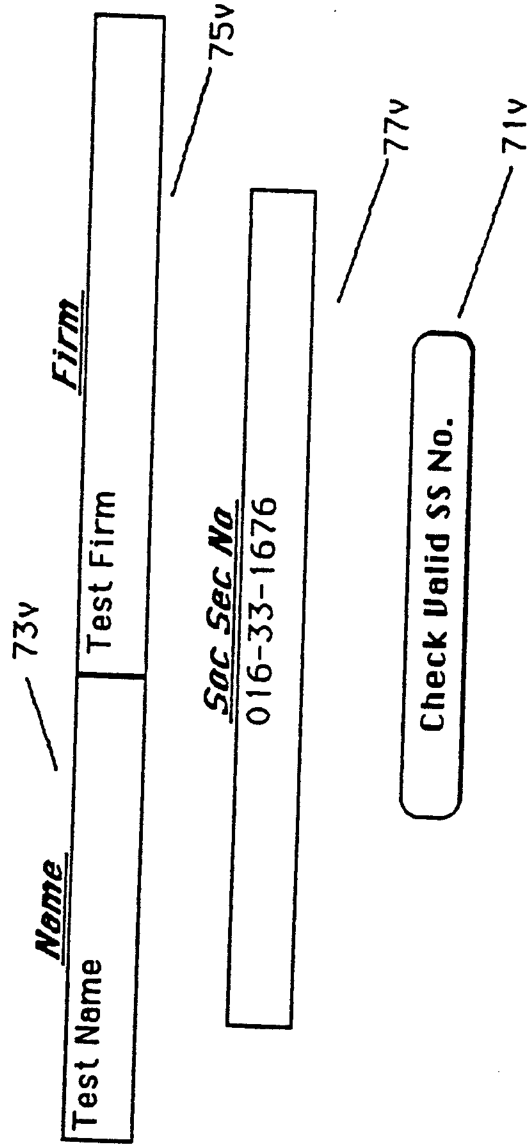

FIG. 5 is a Social Security format for stack B.

Figure 6:
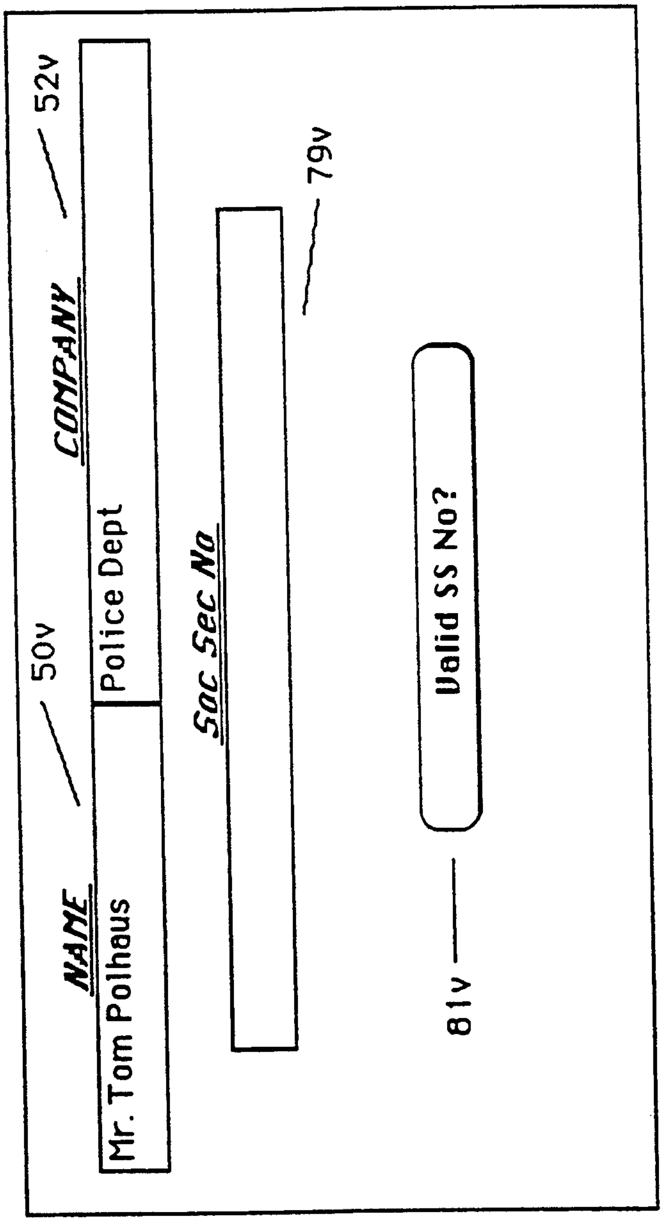
Figure 7A:
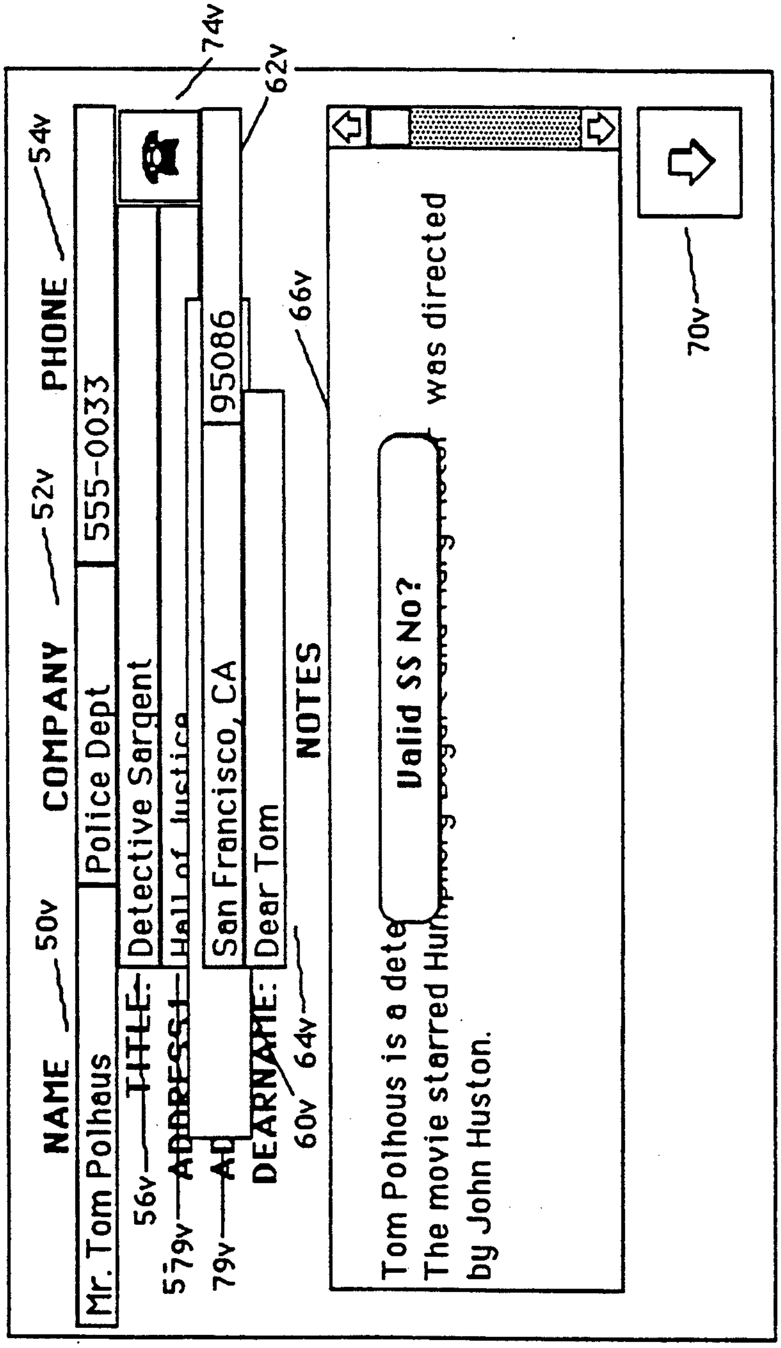
Figure 7B:
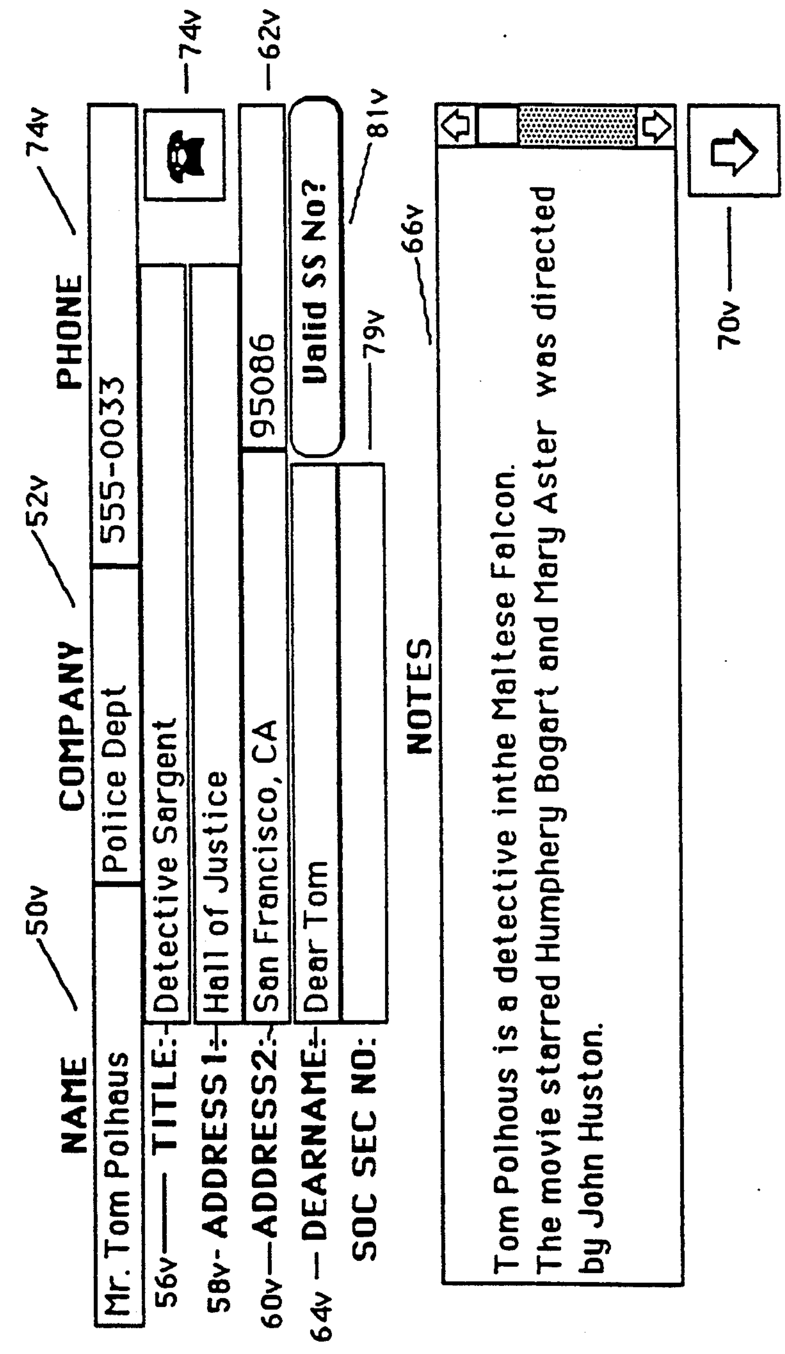

FIG. 6 shows Stack A after the social security format has been ported to it.

FIG. *7a* shows the name and address format for stack A after the ported button and field have been made visible.

FIG. *7b* shows figure *7a*, a new format created by editing with HyperCard.

Figure 8:
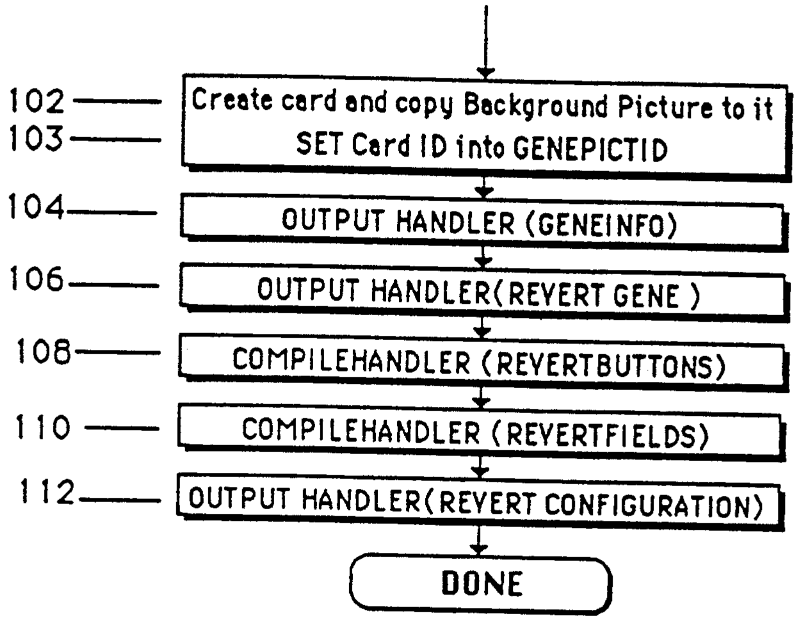

FIG. 8 is a flowchart of the KEEP BACKGROUND FORMAT command

Figure 9:
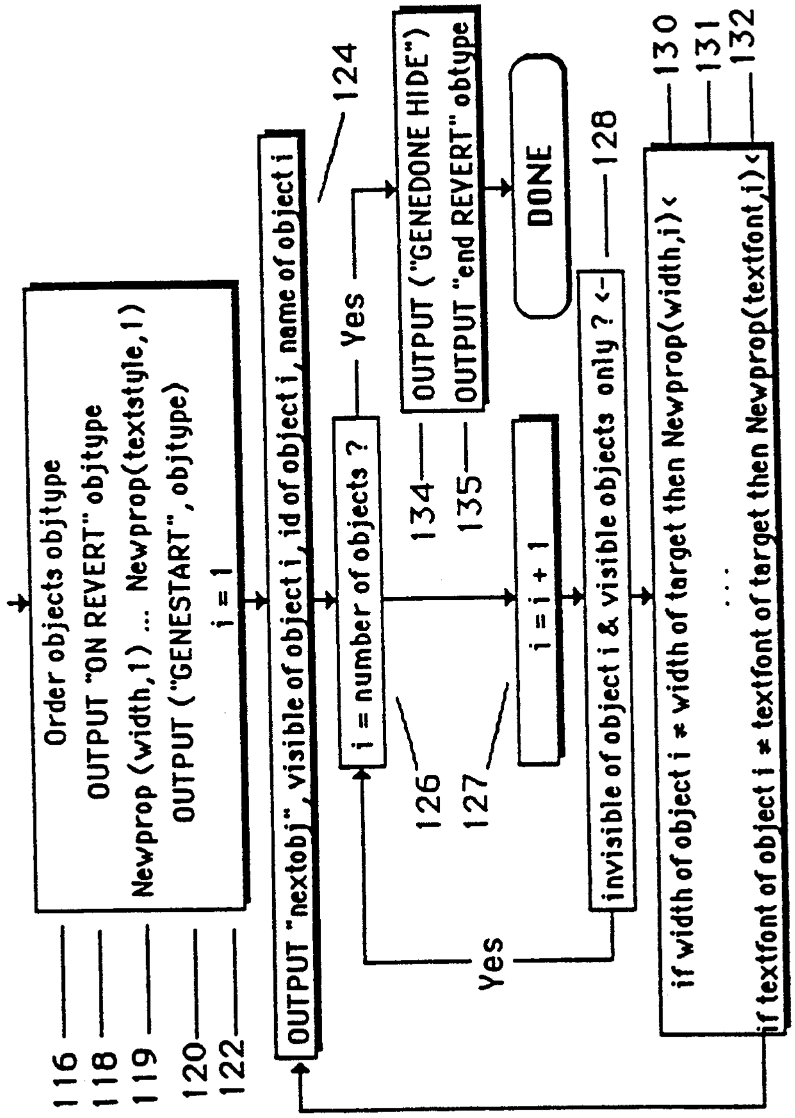

FIG. 9 is a flowchart of COMPILEHANDLER

Figure 10:
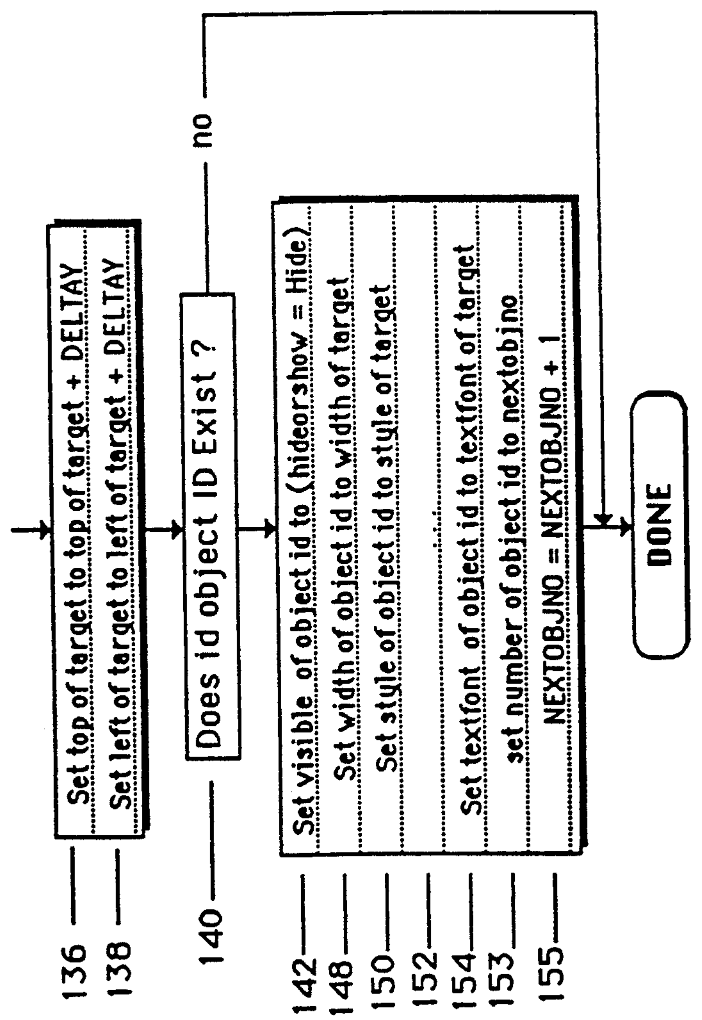

FIG. 10 is a flowchart of the NEXTOBJ hander

Figure 11:
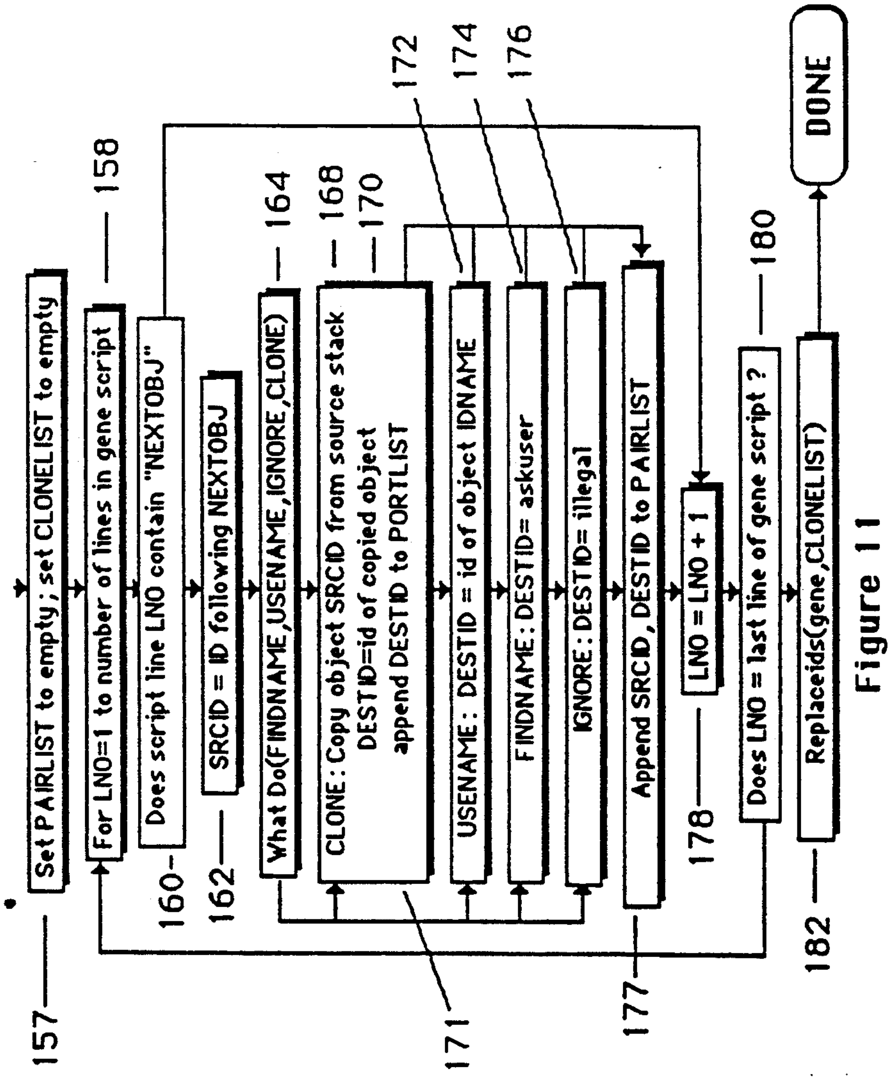

FIG. 11 is a flowchart of CONVERT PORTED GENE

DESCRIPTION OF THE PREFERRED EMBODIMENT

Figure 1:
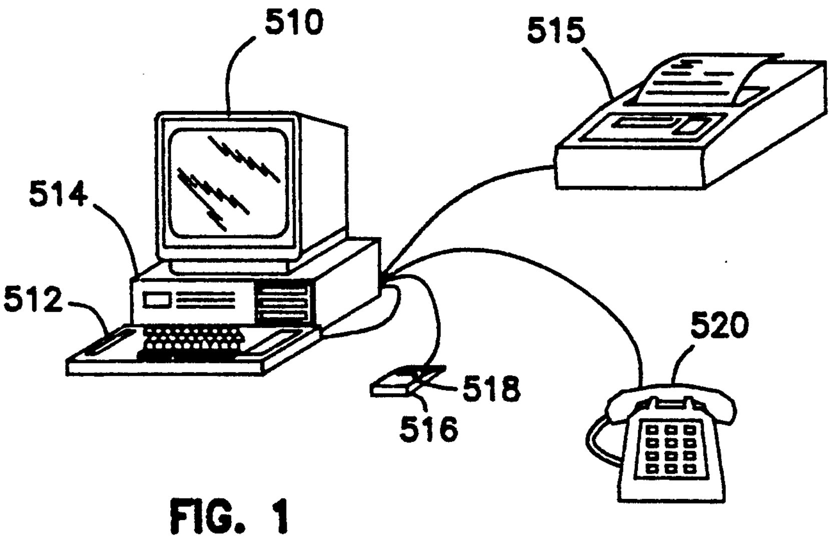
FIG. 1 shows the environment in which the invention works.

Referring now to FIG. 1, the environment of this invention is illustrated. A display device 510 is shown along with a an input device or keyboard 512. Associated with the keyboard 512 and display device 510 is a processor or computer 514. An output device 515 in the form of a printer permits the user to obtain hard copy from the processor 514 in a manner well known in the art. One other item important to the understanding of the invention is mouse 516. A mouse, which is well known in the art, permits the user to manipulate the cursor on the display device 510 and to initiate by "clicking" the button 518 located on the mouse. It should be understood that the mouse is not necessary to the invention although in certain circumstances it provides faster input of information to processor 514. Finally a telephone 520 may be included with the system 500. In one illustration of the invention, the program includes the capability to dial phone numbers by activating an icon on the screen with the button on the mouse. This invention has been developed using an Apple Macintosh SE/30 computer configured as indicated in FIG. 1. Macintosh computers are available from Apple Computer, Inc at 20525 Mariani Ave. Cupertino, CA. 95014. The software disclosed herein as the invention is built on the HyperCard software available for use on the Apple Macintosh. This software is also available from Apple Computer Inc.

In the drawings, reference will be made to visible fields or buttons in the drawings by using a number followed by the letter"v" Statements in the script or program that give properties to the same fields or buttons in the drawings are referred to by the corresponding number followed by the letter "s" The pertinent parts of these scripts or programs are included in this specification as tables. These scripts are written in the Apple Computer language HyperTalk.

Figure 2A:
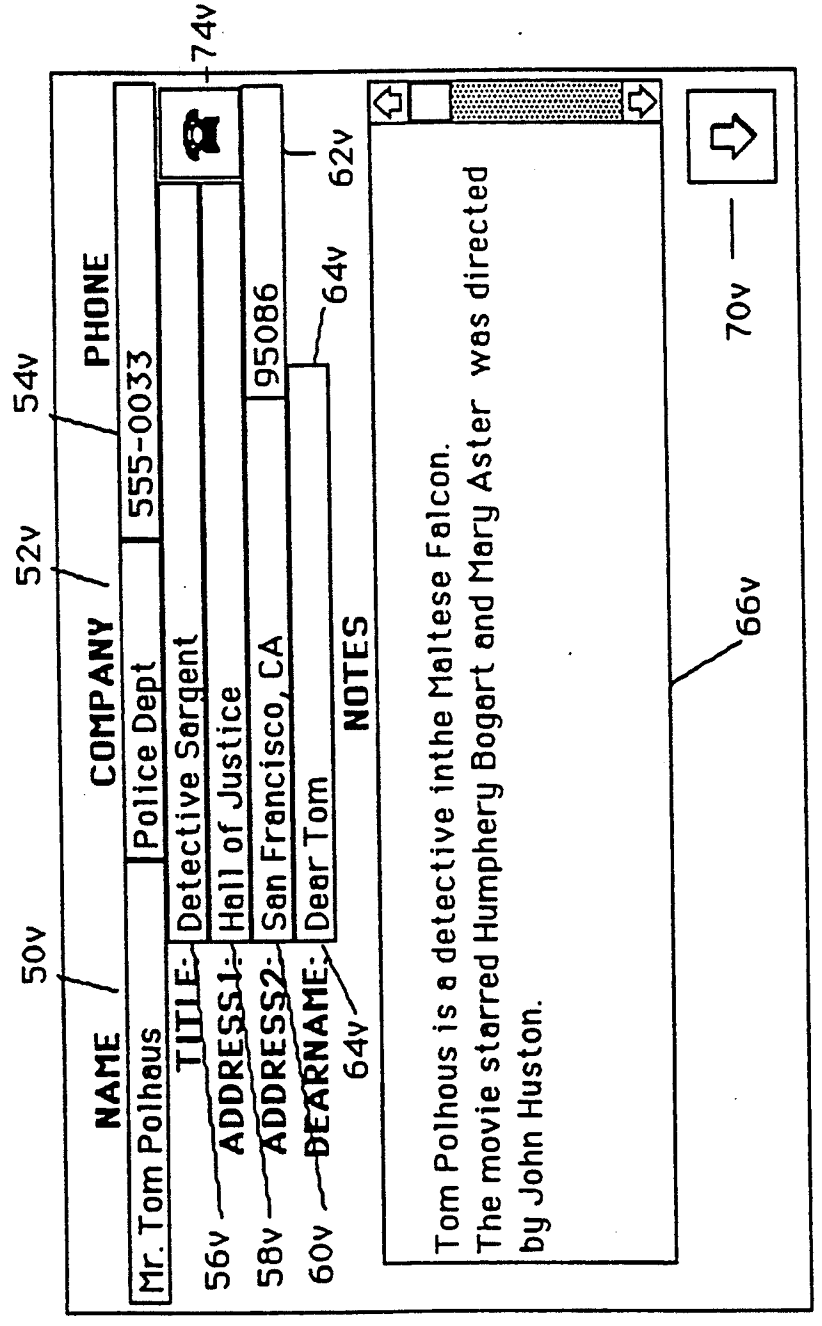

Having set the environment, FIG. 2*a* shows an "address and phone" format for a stack as might appear on display device 510. This is stack A for identification purposes. This format consists of a background graphic, fields and buttons. The background graphic contains the names of the fields (NAME, COMPANY etc.) written on them. The background graphic could be any picture and need not have names on them as can be seen in the background graphic in FIG. 2*d*.

The format has several visible fields: NAME 50*v*, COMPANY 52*v*, PHONE 54*v*, TITLE 56*v*, ADDRESS1 58*v*, ADDRESS2 60*v*, ZIP 62*v*, DEARNAME 64*v* and NOTES 66*v*. In HyperCard these fields contain text information only although they could contain picture, sound or other information including mixed information such as mixed graphics and text.

The format also includes the button DIAL OUT 74*v*. This button is represented as an an icon or graphic image of a telephone and has associated with it an executable program or script. Not all buttons have such graphic icons. The DIAL OUT 74*v*, when activated by appropriate "clicking" of mouse button 518 initiates the HyperTalk script shown in table 1.

TABLE 1

```
on mouseup
    get the selection — 400
    if it is empty then get first line of field "Phone" — 402
    if it is empty then ask "Dial what number?" —404
    if it is not empty then dial it — 406
end mouseUp
```

A button could contain more complex program scripts. In HyperCard this script is executed by manipulating the cursor on display device 510 with mouse 516 so that the cursor is imposed on phone button 74*v* and then pressing the mouse button 518. (It is to be understood that button 518 on mouse 516 is in fact a physical button which can be pressed to accomplish the figurative pushing of the "button" displayed on the display device 510.) Other methods of activating a button could be used, and other methods of execution than buttons could be used. For example, one could use menu objects which contain menu commands and scripts instead of button objects. The DIAL OUT program is simple and is included with HyperCard. In normal use it takes a text string from the field PHONE 54*v* and calls a routine that converts the text string to a series of tones and outputs them to an external port to which a phone 520 is connected. The background could have other buttons with other scripts with other application functions and the format shown in FIG. 2*a* has a second such button, DOWN 70*v* which goes to the next card in the stack.

The DIAL OUT script shown in Table 1 takes a text string from the selected field if one is selected at line 400, or the field PHONE 54*v* if it is not empty at line 402, or from the user by asking for a phone number at line 404. It then calls a handler that converts the text string to a series of tones and outputs them an external port to which a phone is connected at line 406.

Figure 2B:
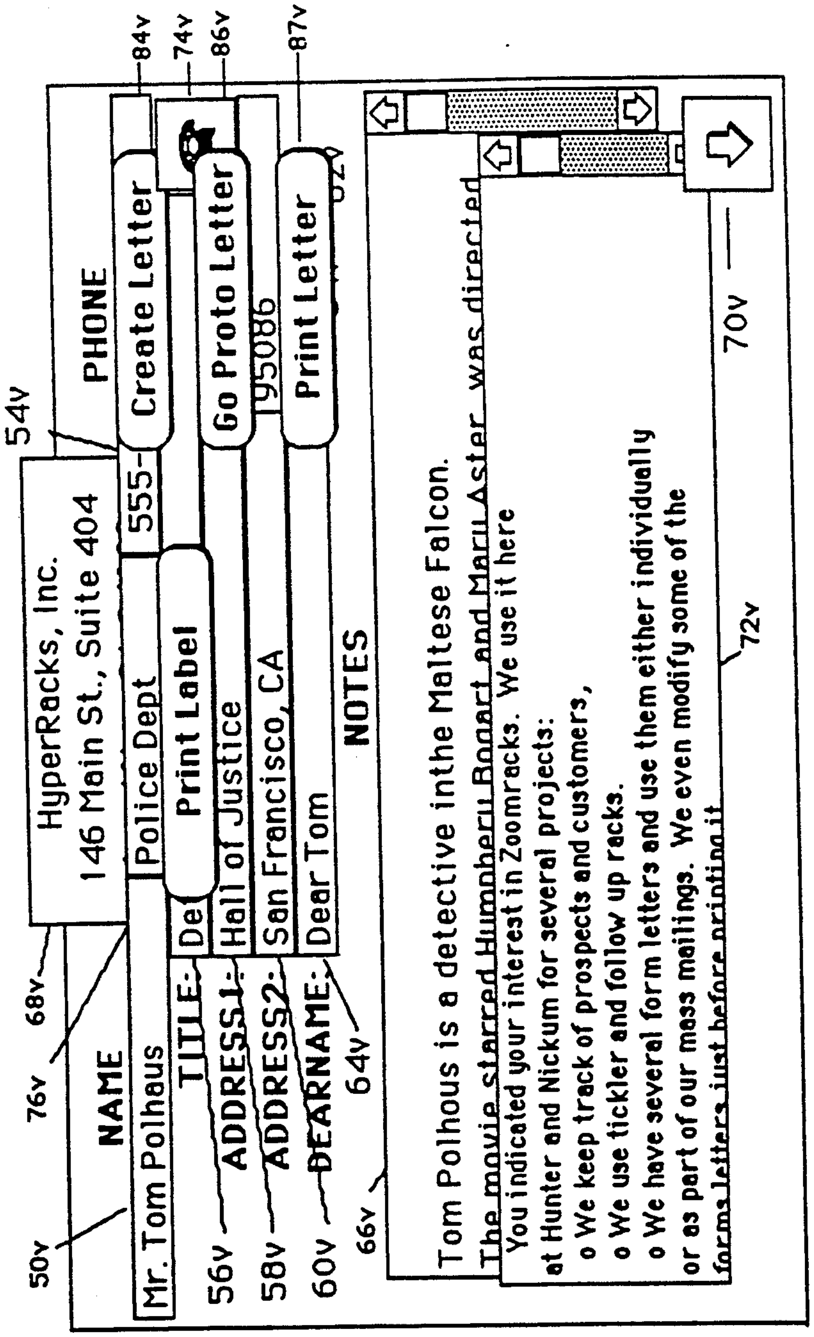

HyperCard only displays those object whose visible property is true. FIG. 2*b* shows the same format shown FIG. 2*a* for stack A except that invisible fields and buttons, whose visible property is false in FIG. 2*a*, are also shown in addition to the background graphic and fields and buttons shown in FIG. 2*a*. The invisible fields are PROTO FROM 68*v*, PROTO DEAR NAME70*v*, and PROTO LETTER 72*v* and the invisible buttons are PRINT LABEL 76*v*, CREATE LETTER 84*v*, GO PROTO LETTER 86*v* and PRINT LETTER 87*v*. FIG. 2*b* shows that a background such as is shown in FIG. 2*a* can contain several invisible objects and buttons.

Figure 2C:
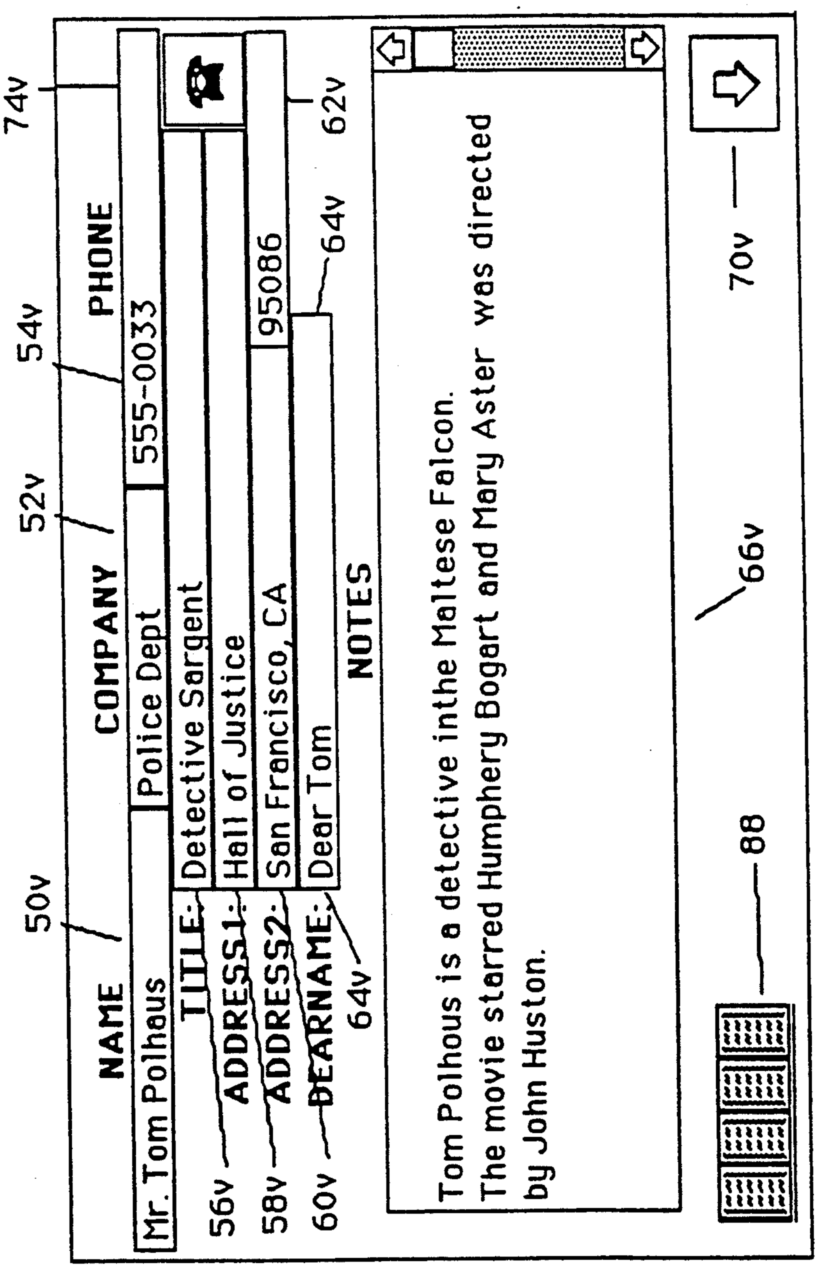
Figure 2D:
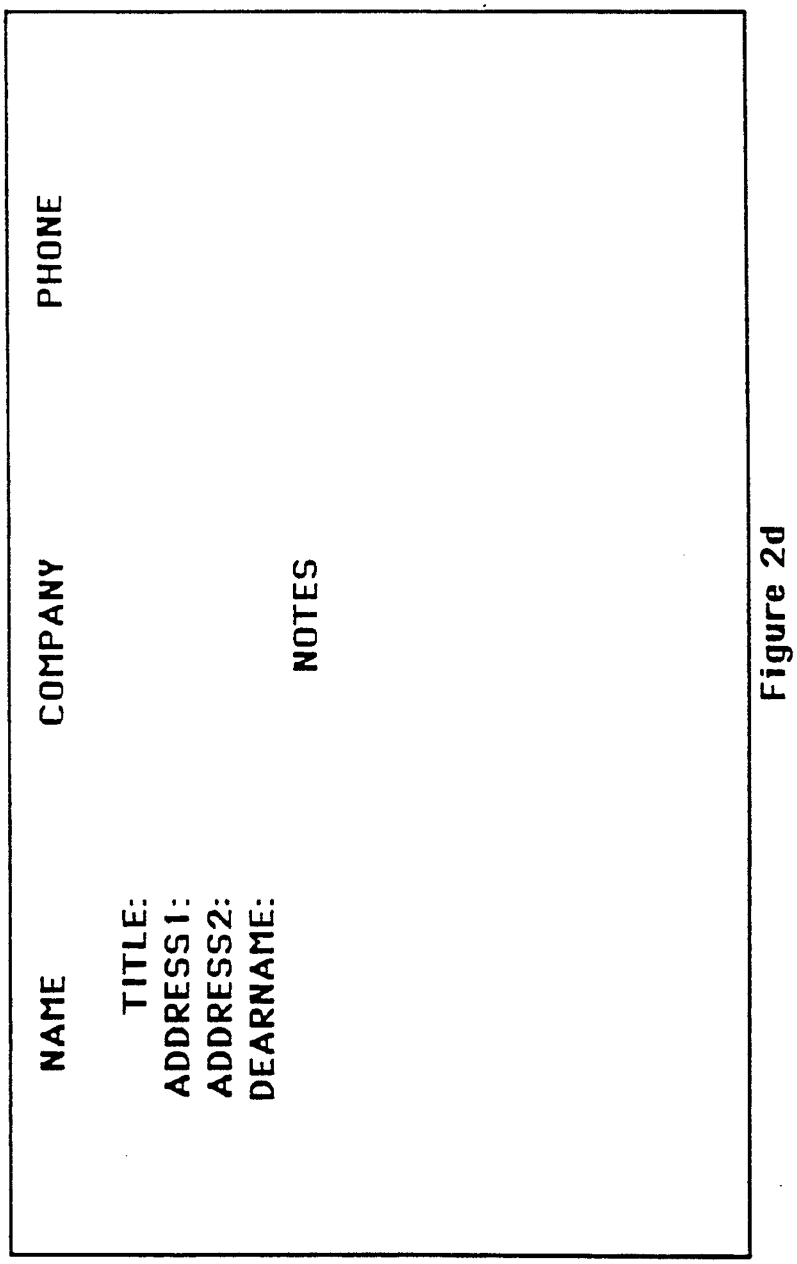

FIG. 2*c* shows the same format for stack A as is shown in FIG. 2*a* except that gene buttons 88 are shown in the lower left corner. An object of this invention is to create such gene buttons with scripts that encode formats. Selecting a gene with mouse 516 and then depressing mouse button 518 will list a name of the gene button which is the format it encodes and a menu of options, one of which, TRANSLATE GENE which if executed translates the gene into its encoded format. These gene buttons will be discussed in detail later.

Figure 3A:
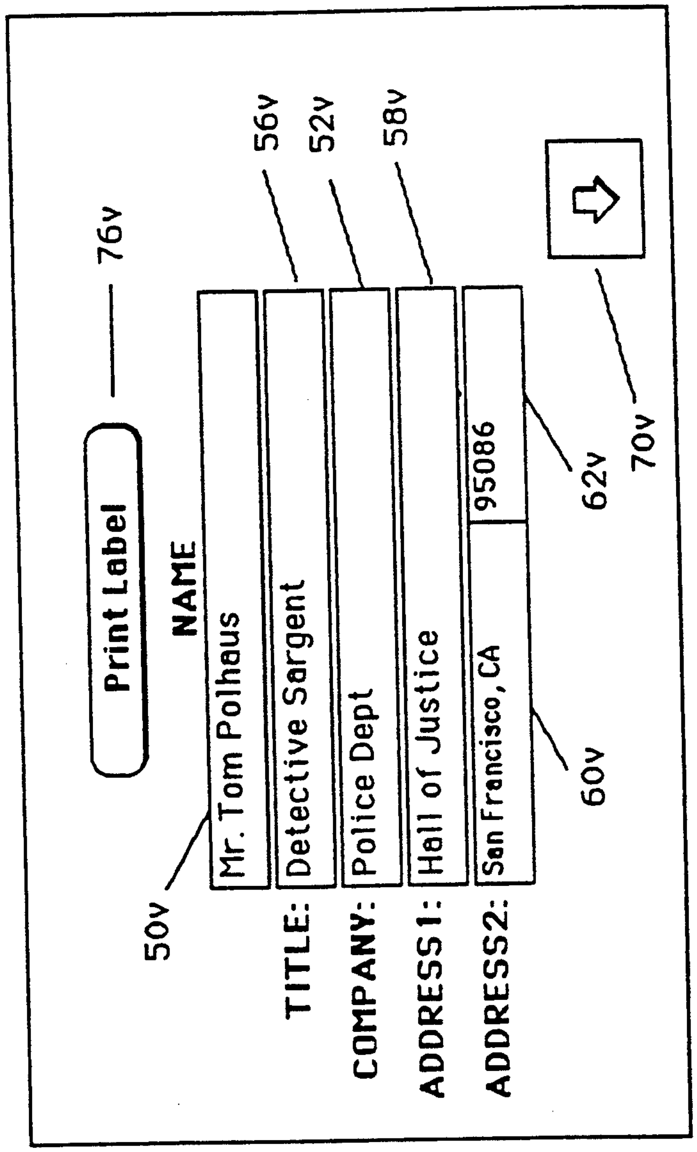
Figure 3B:
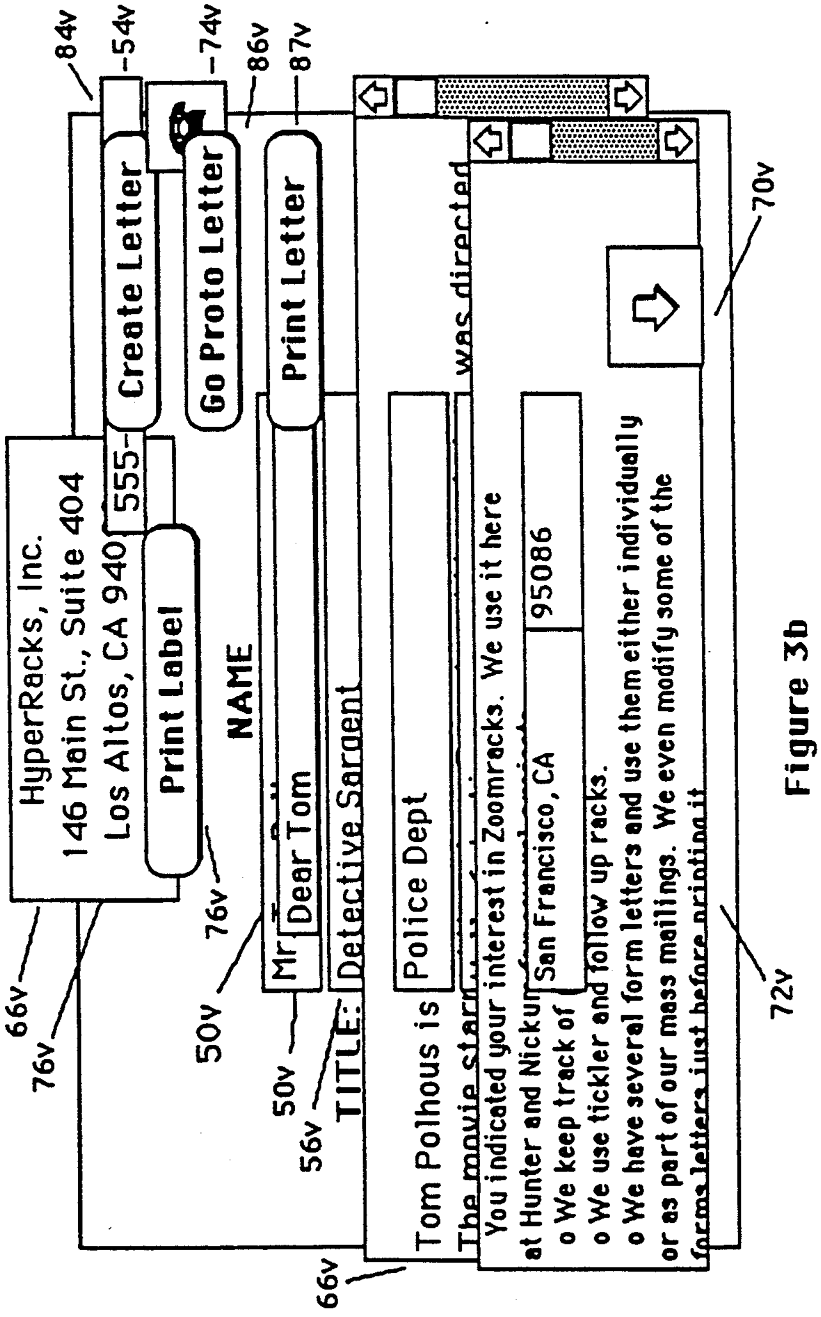

FIG. 3*a* shows the same card from stack A as FIG. 2*a* but with a different "print label" format. It has a different background graphic from FIG. 2*a*; the field names have been moved and the names of now invisible fields do not appear. Many of the same button and field objects are used, but they have different properties. The field objects NAME 50*v*, TITLE 56*v*, ADDRESS! 58*v*, ADDRESS2 60*v*, and ZIP 62*v*, and the button object NEXT CARD 70*v* are all objects that were shown in the format in FIG. 2*a*. Other objects like PHONE 54*v* and NOTES 66*v* are not used in this format and are invisible. This format is designed for printing labels and the button PRINT LABEL 76*v*, which was invisible in FIG. 2*a* is visible in this format and has associated with it a script that prints a label. The locations of the visible fields have been changed in FIG. 3*a* from what they were in FIG. 2*a*. The background graphic with the names of the fields is different in FIG. 2*a* from what is in FIG. 3*a*; FIG. 3*b* shows the same format as shown in FIG. 3*a* but with the invisible field and button objects from the card also appearing. These the fields are PHONE 54*v*, DEARNAME 64*v*, NOTES 66*v* and the buttons DIAL OUT 74*v*, CREATE PROTO LETTER 84*v*, GO PROTO LETTER 86*v*, and PRINT LETTER 87*v*.

Figure 4A:
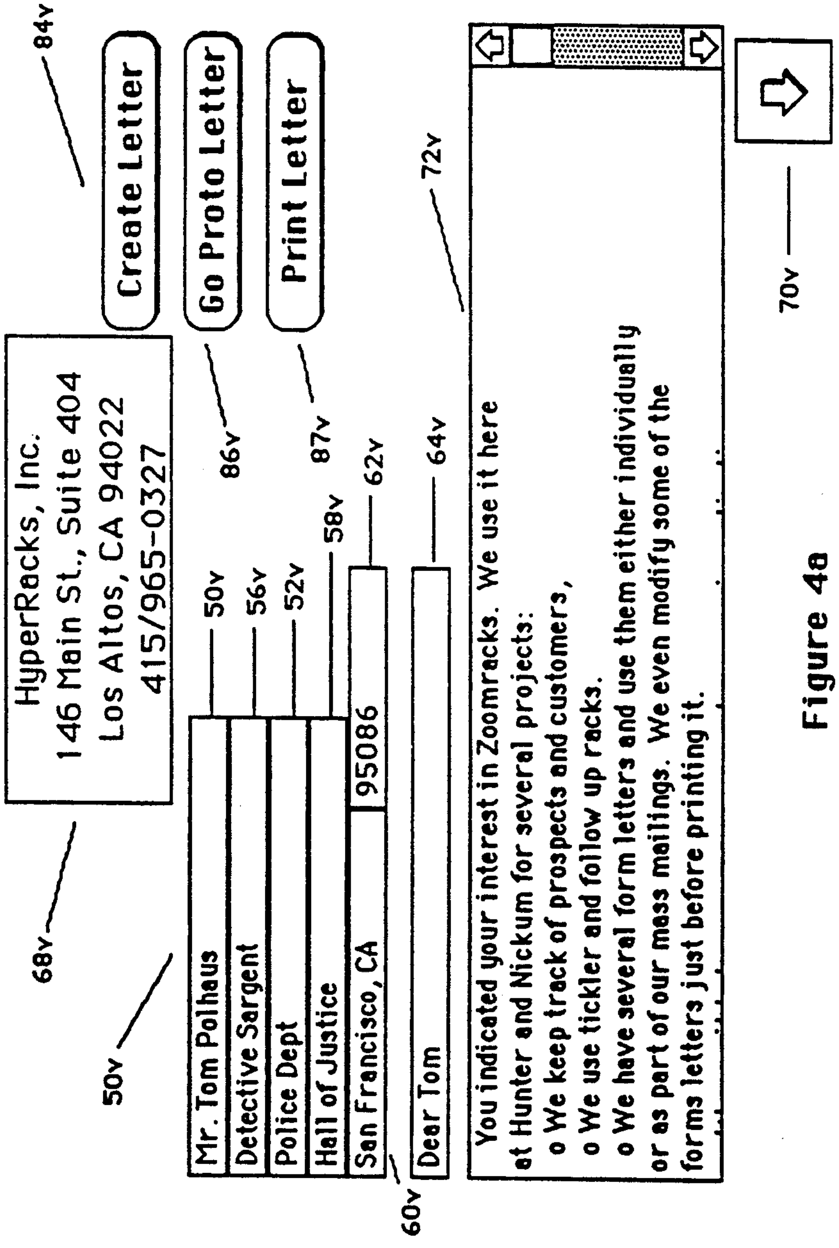
Figure 4B:
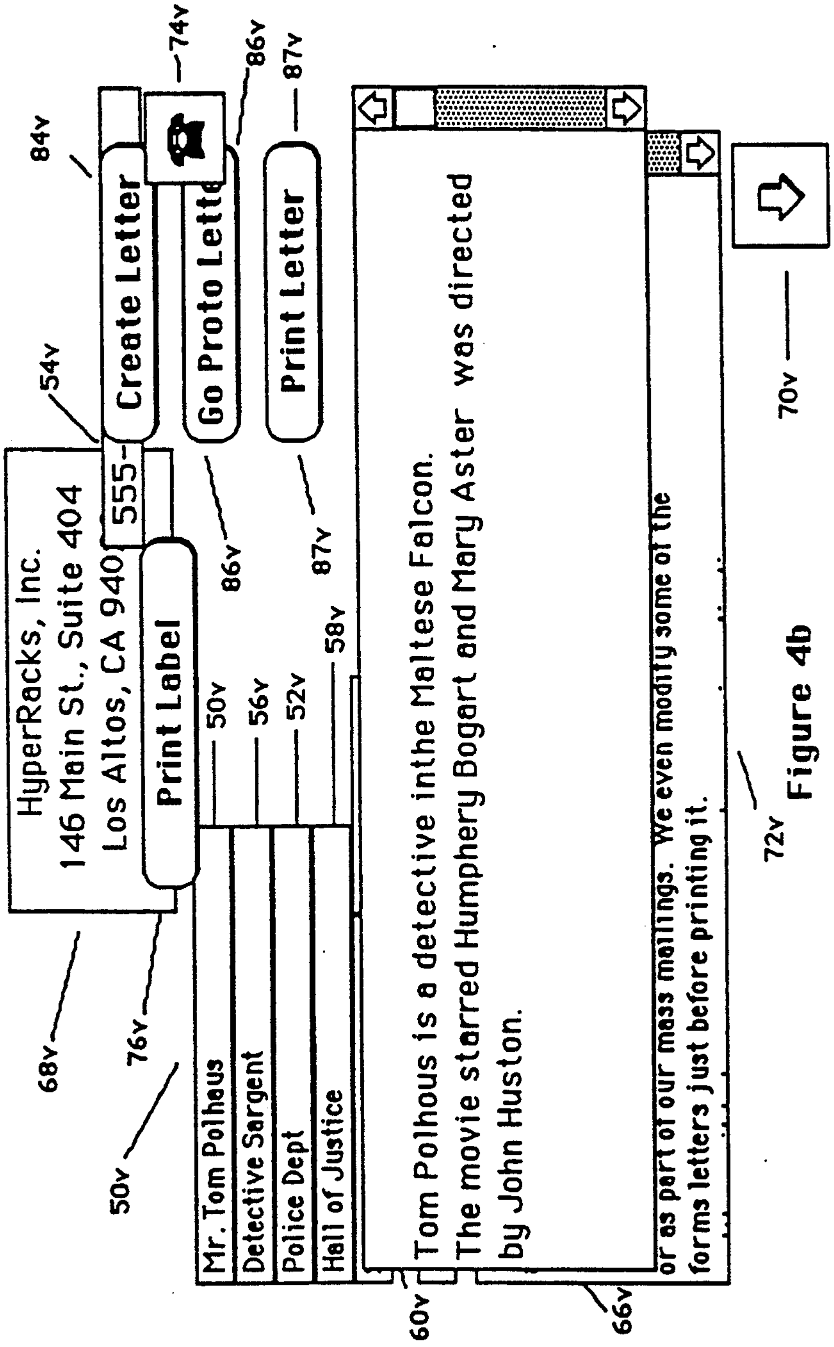

FIG. 4*a* shows the same card as in FIGS. 2*a* and 3*a*. It contains a third "mail merge" format for stack A. This format is designed for writing letters and doing mail merge and its fields are arranged as they would appear in a letter. Its background graphic is white and does not have field names so it looks like a letter. It uses the field NAME 50*v*, TITLE 56*v*, ADDRESS1 58*v*, ADDRESS2 60*v*, ZIP 62*v*, and the button NEXT CARD 70*v*, as well as objects that were not used and thus were not visible in earlier formats: the fields PROTOFROM 68*v*, PROTO LETTER 72*v* and the buttons CREATE LETTER 84*v*, GO PROTO LETTER 86*v*, and PRINT LETTER 87*v*. FIG. 4*b* shows the same format as FIG. 4a with the invisible objects made visible: the fields PHONE 54v, NOTES 66v and the buttons PRINT LABEL 76v and DIAL OUT 74v.

HyperCard users can change the format of a stack A from FIG. 2a to FIG. 3a, or FIG. 4a to FIG. 2a, or make other format changes by using HyperCard's FIELD and BUTTON commands to move and resize the field and button objects on the background and change other field and button properties. Some object properties such as VISIBLE, can be changed only with a HyperTalk statement. For example, "SET VISIBLE OF BKGND FIELD "DIAL OUT" TO FALSE" makes the DIAL OUT field invisible. Once the user has a format he wants, the invention described here provides a way to save it so he can restore to that format in the future. This capability is not available in the Hypercard program. The invention also provides a way to save many different saved formats for the same stack such as the three formats for stack A shown in FIGS., 2a, 3a and 4a so each can be selectively restored when desired.

Format of Gene Scripts

A command called KEEP BACKGROUND FORMAT compiles a gene script that specifies the properties of all objects on the background in a form that, when executed, restores the properties of those objects. Thus a user can create the format shown in FIG. 2a using standard HyperCard tools and save it in a gene script with the KEEP BACKGROUND FORMAT command; then change the background to FIG. 3a using standard HyperCard tools and saves it in the new format in a second gene script with another KEEP BACKGROUND FORMAT command; and then change the background to FIG. 4a using standard Hypercard tools and create a third gene script with another KEEP BACKGROUND FORMAT command. Now, executing one of the three gene scripts restores the associated background format for that stack.

The KEEP BACKGROUND FORMAT command puts the script in a background button called TRANSLATE BACKGROUND which is the left button of the four buttons 88 in FIG. 2c. Other commands let the user clone and name the genes which specify the formats. The other three of the four gene buttons 88 on the bottom right of FIG. 2c specify the three formats for 2a, 3a, and 4a.

While the major objective of the invention is to save the properties of buttons and fields, it also to save the graphic picture in the background and configuration variables.

The KEEP BACKGROUND FORMAT command works as is shown in the flowchart in FIG. 8. First it creates a new card in the stack and copies the background graphic to that card 102 and stores that ID in the global variable GENEPICTID 103, then it outputs a handler GENEINFO 104, then handler TRANSLATEGENE 106, then handler TRANSLATEBUTTONS 108, then handler TRANSLATEFIELDS 110 and then the handler TRANSLATECONFIGURATION 112.

TABLE 2

```
On GeneInfo — 2
   Put "HD 40:Hracks2:Qnames" into GENERACK — 4
   put "card id 8337" into GENEPICTID — 6
end GeneInfo — 8
```

Table 2 contains the handler (or subroutine) called GENEINFO beginning with ON GENEINFO 2 and ending with END GENEINFO 8. All handlers begin and end similarly. This handler defines global variables and information about the state when the gene script was generated. Statement 4 of this handler specifies the name of the stack (file) the gene was generated from. If the gene is copied to another stack, this name can be used to recognize the gene as foreign. Installing foreign genes in stacks is described later. Statement 6 defines the global GENEPICTID as the ID of the card that contains the saved background picture.

TABLE 3

```
on TRANSLATEGENE — 2
   GENEINFO — 9
   TRANSLATEFIELDS — 10
   TRANSLATEBUTTONS — 12
   TRANSLATEPICTURE — 14
   TRANSLATECONFIGURATION" — 16
end TRANSLATEGENE — 8
```

Table 3 contains the handler, TRANSLATEGENE which translates the complete format from the gene. It executes statement 9 to define global variables, statement 10 to translate the field formats, statement 12 to translate the button formats, statement 14 to translate the background picture and statement 16 to translate the stack configuration. With the exception of TRANSLATEPICTURE, each of these handlers is compiled in the gene script and will be described shortly.

TRANSLATEPICTURE just copies the graphic image from the card specified by the global variable PICTURED onto the background. An examination of the cards in 2a, 3a, and 4a shows that while the background texture is the same for all, the field names which are part of the background graphic image are different for each. It is these images that are restored with the TRANSLATEPICTURE handler.

TRANSLATEBUTTON and TRANSLATEFIELD are identical in concept, one translating buttons and the other fields. Both of these scripts are compiled from the properties of their objects.

The art of constructing Compilers is well understood given specification of the input and output languages. The input language is the arrangement of buttons or fields on the screens, the output is the gene scripts described here. The complete script for the gene format shown in FIG. 2a is presented in Tables 2,3,4,6,7, 8 and 9. While not necessary, scripts written in a host language enable users who are familiar with that language to use its capabilities.

There are many different kinds of scripts that could be compiled and would restore the format. The simplest and most obvious compiler would output N times P statements where N is the number of objects and P is the number of properties or attributes of the object. There would be P statements for each of N objects, each statement specifying a different property for a its object. The preferred embodiment compiles scripts that specify property changes only, and thus are shorter, less error prone and have other desirable properties.

Scripts for Translating to Button and Field Formats

The TRANSLATEFIELDS and TRANSLATEBUTTONS handlers differ only in that one translates the properties of the fields, the other of the buttons. The basic concept behind the scripts in Tables 4, 6, 7 and 8 is that the compiled script consists of alternate groups of statements which (a) redefine the current value of the properties to be assigned to field or button objects, and (b) "nextobj" statements which assign to a specific object the then current values of those properties, some of which have just been changed. Table 4 shows the handler that translates the properties of the fields to that shown in FIG. 2*a*. Line 2 and line 8 define the beginning and ending of the handler. Lines 18 define the initial current value of all the field properties. The word "target" appearing in these and other statements is an an object which maintains the current standard values of properties. In the current implementation the reversion scripts run in the gene button which is the target and takes on the current properties. However, the properties could be saved in global variables or some other way.

GENESTART FLD 24 calls the handler GENESTART which initializes the format for all the fields (or if its argument is BTN, for all the buttons). Its task is to do the initialization. In particularly it must make all the background field objects are invisible so that any objects whose properties are not specified in the script will not appear in the background. This is important because new objects added after the gene script was created should not be visible after the gene is translated. This routine initializes the global NEXTOBJECTNUMBER to 1 which specifies number property of the next object to be output.

It is preferable that GENESTART FLD 24 follow the statements which initialize the parameters 18. This allows the interception of the GENESTART handler to override the initial property specifications.

TABLE 4

```
on TRANSLATEFIELDS --- 2
    set visible of target to true --- 18
    set textfont of target to Geneva --- 18
    set textstyle of target to plain --- 18
    set textalign of target to left --- 18
    set textsize of target to 12 --- 18
    set textheight of target to 16 --- 18
    set style of target to rectangle --- 18
    set width of target to 167 --- 18
    set height of target to 16 --- 18
    set top of target to 59 --- 18
    set left of target to 14 --- 18
    GeneStart "Fld" --- 24
    nextObj Show, "bg fld id 1162", "NAME" --1 "14,59,181,75" ---50 s
    set width of target to 119 --- 28
    put 167 into XDELTA --- 30
    put 0 into YDELTA --- 32
    nextObj Show, "bg fld id 1197", "COMPANY" --2 "181,59,300,75" --- 52s
    set width of target to 173 --- 28
    put 119 into XDELTA --- 30
    nextObj Show, "bg fld id 1195", "PHONE" --3 "300,59,473,75" --- 54s
    set width of target to 225 --- 28
    put -150 into XDELTA --- 30
    put 16 into YDELTA --- 32
    nextObj Show, "bg fld id 1196", "TITLE" --4 "150,75,375,91" --- 56s
    put 0 into XDELTA --- 30
    nextObj Show, "bg fld id 1198", "ADDRESS1" --5 "150,91,435,107" --- 58s
    set width of target to 203 --- 28
    nextObj Show, "bg fld id 1199", "ADDRESS2" --6 "150,107,393,123" --- 60s
    set width of target to 120 --- 28
    put 202 into XDELTA--- 30
    put 0 into YDELTA--- 32
    nextObj Show, "bg fld id 1366", "Zip" --7 "393,107,472,123" --- 62s
    set width of target to 215 --- 28
    put -202 into XDELTA--- 30
    put 16 into YDELTA--- 32
    nextObj Show, "bg fld id 1200", "DEARNAME" --8 "150,123,365,139" -- 64s
    set style of target to scrolling --- 28
    set width of target to 445 --- 28
    et height of target to 112 --- 28
    put -122 into XDELTA--- 30
    put 32 into YDELTA --- 32
    nextObj Show, "bg fld id 1201", "NOTES" --9 "28,155,473,267" --- 66s
    [code from Table 6 would be inserted here] --- 20
    GeneDone Hide --Unspecified Objects Hide,Show or AsIs --- 36
end TRANSLATEFIELDS --- 8
```

The lines 18 in Table 4 define the initial "current" properties which will be given to the object specified by the first NEXTOBJ statement in line 50*s*. Lines 28, 30 and 32 redefine the current values of some properties for future NEXTOBJ statements. Line 50*s* assign the initial current properties to "bg fld id 1162", statement 52*s* assigns the then current properties to "bg fld id 1197", and statements 54*s*, 56*s*, 68*s*,58*s*, 60*s*, 62, 64*s*, and 66*s* assign the then current properties to the objects specified in the statement, lines 28,30 and 32 preceding each NEXTOBJ statement.

The use of "current" properties which are incrementally changed and are assigned to objects is a useful but not necessary feature of the invention. It is valuable because where successive objects have the same properties—which is frequently the case—then properties are specified once making the script shorter, easier to read, and easier to edit. Also, a differential specifications bring attention to differences between object properties which may be errors. For example successive objects may have widths of 18, 19, 17, 19, and 20. In this case a single width will likely be desired and thus one statement width replaces 5. Table 4 and especially 12 show several successful objects taking on the same properties in a compact script.

Statement 50*s* corresponds to the object 50*v* shown in FIG. 2*a* and when executed will give object 50*v* the properties it displays in FIG. 2*a*. Statement 50*s* which assigns the current properties to an object also appears in Table 5.

TABLE 5

| 90 | 91 | 92 | 93 | 94 | 95 | 96 |
|---|---|---|---|---|---|---|
| NEXTOBJ | SHOW, | "Bg fld id 1162", | "NAME" | -- | 1 | "14,59,181,75" |

The first word on the line 90 is a call for the NEXTOBJ handler with the arguments 91, 92 and 93. and the comment 94, 95 and 96. The first argument 91 can be HIDE indicating that the object should be invisible, or SHOW indicating it should be visible. (It can also have the values ASIS which means don't change its visibility or TOGGLE which means invert its visibility, but these are not often used.) The second argument 92 is a unique identifier specifying the object to be assigned the properties in target. HyperCard assigns unique identifiers to each object it creates and these are used here; other handles such as ORDER and NAME are not unique as they may be changed. The third argument 93 is the object's name. It appears as an argument for use in the to be described gene porting, but also serves as a useful command to identify the object in question. The two dashes 94 are HyperTalk's indication a comment follows. The comment consists of the object number 95 and the object's coordinates 96 in pixels at the time the gene script was created.

NEXTOBJ copies the current properties saved in target to the specific object 92 making it visible as indicated by the first argument 91. NEXTOBJ treats the following objects as special:

ORDER: The property order is a number from 1 to the number of buttons or fields and specifies the order in which the objects are layered on top of each other. Order is important as it specifies overlapping. HyperCard does not allow direct setting of the property order; however by outputting the objects in the order they appear, Hypercard does allow a mechanism to force a property to a desired order. NEXTOBJ forces the current object to have the number specified by the global NEXTOBJECTNUMBER which it starts at 1 and increments every time it is executed. The display of fields and buttons on top of each other in FIGS. 2*b*, 3*b* and 4*b* indicate their ordering. Where one object overlaps another as 74*v* overlaps 87*v* in FIG. 4*b*, it indicates that the overlapping object has a lower value for the ORDER property than the overlapped object. The order changes between formats and in FIG. 2*b*, unlike FIG. 4*b*, the button 74*v* is overlapped by 87*v*.

NAME: The name could be specified in the gene script but is not. If it were then if the user changes the name of an object in one format, that object will still have its old name in other formats. It seems more natural for each object to have the same name in all its formats and so the propety name is not specified in the gene script format.

SCRIPT: The object's script is not specified by the gene script for the same reason the NAME is not changed. If the user changes a script in one format (e.g. DIAL OUT), he probably means to have that change occur in all formats.

VISIBLE: This is specified by the first argument 91. This lets the user edit HIDE to SHOW so translating the gene makes that object visible, or edit SHOW to HIDE to make it invisible. The VISIBLE property is output as an absolute, rather than a differential value because one normally wants to change the visibility of objects individually.

TOP: HyperCard objects have properties that specify the location of an object, but it does not have properties that specify the distance an object is from the previous object. Since objects are frequently evenly spaced vertically or horizontally, such properties are desirable as they encode more efficient scripts to the extent that the distances between objects are regular. For this reasons the compiler does not output absolute values for locations but differential values. For each object line 32 specifies YDELTA, the Y distance in pixels the next object is from the previous object. YDELTA (and XDELTA) are zeroed by GENESTART. When the flow chart in FIG. 11 is explained the use of YDELTA (and XDELTA) will be made clear.

LEFT: Similarly, the compiler outputs a XDELTA to specify a relative distance between objects.

These properties were treated as special because HyperCard did not support them fully (ORDER), or because it seemed to be the best way to implement the invention. Other choices may be as good or better.

The script continues specifying objects 52*s*, 54*s*, 56*s*, 60*s*, 62*s*, 64*s*, and 66*s* with property or attribute change statements 28, 30 and 32 interspersed. At the end the GENEDONE statement does necessary cleanup it takes an argument HIDE or SHOW or ASIS which specifies what should be done with the objects whose visibility was not specified. Normally HIDE is used, as the unspecified object normally should be invisible. SHOW makes the unspecified objects visible, and ASIS leaves them with their current visibility. END TRANSLATEFIELDS 8 terminates the handler.

Visible And Invisible Object Specification

Two possible script forms can be generated. The one shown in table 4 shows only those objects that are visible. A second possibility is to specify all objects. The script of table 4 with the insertion of table 6 at location 20 in Table 4 does this for the FIG. 2*a* format. The advantage of specifying only visible objects is that the scripts are shorter and the invisible and presumably irrelevant objects do not appear. The advantage of specifying all objects is to provide a complete record of what is on the background and to allow finding and making hidden objects visible.

TABLE 6

```
set textalign of target to center — 28
set style of target to rectangle — 28
set width of target to 174 — 28
set height of target to 64 — 28
put 140 into XDELTA — 30
put −133 into YDELTA— 32
nextObj Hide, "bg fld id 1304", "Proto From" --10 "168,22,342,86" — 68s
set textalign of target to left — 28
set textsize of target to 10 — 28
```

TABLE 6-continued

```
set style of target to scrolling --- 28
set width of target to 440 --- 28
set height of target to 97 --- 28
put 147 into XDELTA --- 30
put 176 into YDELTA--- 32
nextObj Hide, "bg fld id 1263", "Proto Letter" --12 "16,217,456,314" -- 72s
```

Table 7 specifies the handler that translates the properties of the visible background buttons. It is similar to the TRANSLATEFIELDS handler. Statement 74s outputs the DIAL OUT button and statement 70s outputs the DOWN button.

TABLE 7

```
on TRANSLATEBUTTONS --- 2
    set visible of target to true --- 18
    . . . --- 18
    set icon of target to 30696
    set top of target to 76 --- 18
    set left of target to 436 --- 18
    GeneStart "Btn" --- 24
    nextObj Show, "bg btn id 1472", "DIAL OUT" --1 "477,52,512,83" --- 74s
    set width of target to 37 --- 28
    set height of target to 28 --- 28
    set icon of target to 2730 --- 28
    put 231 into YDELTA --- 32
    nextObj Show, "Bkgnd btn id 1509", "DOWN" --2 "436,307,473,335" -- 70s
    [code from Figure 8c would be inserted here] --- 20
    GeneDone Hide --Unspecified Objects Hide,Show or AsIs --- 36
end TRANSLATEBUTTONS --- 8
```

Table 8 specifies the code that would be inserted to specify the invisible button properties. The description of this output is the same as for fields.

TABLE 8

```
set style of target to roundRect --- 28
set width of target to 132 --- 28
set height of target to 22 --- 28
set showname of target to true --- 28
set icon of target to 0 --- 28
put -264 into XDELTA --- 30
put -234 into YDELTA--- 32
nextObj Hide, "Bkgnd btn id 1360", Print Label" --10 "172,73,304,95"---76s
set width of target to 153 --- 28
put 167 into XDELTA --- 30
put -52 into YDELTA --- 32
nextObj Hide, "Bkgnd btn id 1302", "Create Letter" --11 "339,21,492,43" --
84s
put 0 into XDELTA --- 30
put 30 into YDELTA --- 32
nextObj Hide, "Bkgnd btn id 1383", "Go Proto Letter" --12 . . . --- 86s
nextObj Hide, "Bkgnd btn id 1518", "Print Letter" --13 . . . --- 87s
```

Since it may be appropriate for different formats for different values for certain global and viewing variables, a configuration script is compiled which saves and restores these values. Table 9 shows the configuration script for FIG. *2a*. Several kinds of global variables might be saved in the configuration script. The script shown in table 9 contains the globals saved in the current implementation. Those that have numbered statements are briefly described here. HyperCard has global paint properties called pattern, textfont, textsize textheight and textstyle that control painting and these are specified in statements 40. Line 220 specifies whether the stack should be displayed in rack mode showing only the first line of each card as is taught in U.S. Pat. No. 4,736,308 or in full card mode. Statement 222 specifies whether the stack should be locked so the use can view and navigate through just those cards which match a search criteria as is taught in U.S. Pat. No. 4,736,308. Statement 223 specifies the search criteria. Statement 224 specifies whether the fields should be zoomed to overlay the names in the background as is taught in U.S. Pat. No. 4,736,308. Statement 226 specifies whether or not the current field is zoomed as is taught in U.S. Pat. No. 4,486,857. Statement 228 specifies the dimensions of the zoomed area. Statement 230 specifies the dimensions of the Zoom rack area which where the first line of each card is displayed when in rack mode.

TABLE 9

```
on TRANSLATECONFIGURATION --- 2
    GeneStart "Cnf" --- 24
    hrkSet "pattern","2"              -- Paint Pattern: Repaint & Retitle ---40
    hrkSet "textfont","Geneva"        -- text font for: Repaint & Retitle ---40
    hrkSet "textsize","12"            -- text size for: Repaint & Retitle ---40
    hrkSet "textheight","16"          -- text height for: Repaint & Retitle ---40
    hrkSet "textstyle","bold"         -- Stack text style: Repaint & Retitle ---
40
    hrkSet "ZRack","false"            -- True means: √ Zoom Rack --- 220
```

TABLE 9-continued

| | |
|---|---|
| hrkSet "FindLock","false" | -- True means: √ Find Lock ---222 |
| hrkSet "FindCom","find"& quote &"mor"& quote &"in bg fld"& quote &"ADDRESS2"& quote &"" --- 223 | |
| hrkSet "ZNAMES","false" | -- True means: √ Zoom Names ---224 |
| hrkSet "ZField","false" | -- True means: √ Zoom Field --- 226 |
| hrkSet "ZFRect","39,84,493,287" | -- Window Rectangle for: Zoom Field -- 228 |
| hrkSet "ZRRect","39,84,493,287" | -- Window Rectangle for: Zoom Rack -- 230 |
| hrkSet "SortLock","false" | -- True means: √ Sort Lock |
| hrkSet "Archivemode","false" | -- True means: √ Archive Cards |
| hrkSet "CardId","11319" | -- ID of card to to go to: empty = none |
| hrkSet "HrkSelFldId","1195" | -- ID of Current Field: empty = none |
| hrkSet "SortCom","sort text by fld"& quote &"NAME"& quote &"" | |
| hrkSet "Archivestack","" | -- Stack for cut & deleted cards |
| hrkSet "HRacksMode","true" | -- True means: √ HyperRacks |
| hrkSet "DeltaX","10" | -- Maximum X-Axis adjust for Tile Fields |
| hrkSet "DeltaY","8" | -- Maximum Y-Axis adjust for Tile Fields |
| hrkSet "ZRRect","−43,116,406,312" | -- Window Rectangle for: Zoom Rack |
| hrkSet "RackFldList","" | -- Flds in Rack: Zoom Rack |
| hrkSet "ZNRect","0,0,0,0" | -- Window Rectangle for: Zoom Names |
| hrkSet "ZFRect","39,84,493,287" | -- Window Rectangle for: Zoom Field |
| hrkSet "PaintRect","0,0,5,11,341" | -- Rectangle of area repainted: Paint & Tile |
| hrkSet "Marbling","" | -- List of marbling commands: LDIT |
| GeneDone Hide --Unspecified Objects Hide, Show or Asls --- 36 | |
| end TRANSLATECONFIGURATION --- 8 | |

In Table 9 the statements 2, 24, 36 and 8 are the beginning and ending statements discussed earlier. The statements labeled 40 such as the one in table 10 specify the globals:

TABLE 10

| | |
|---|---|
| hrkSet "textfont","Geneva" | -- Stack text font for: Repaint & Retitle ---40 |

Here HRKSET sets the global variable specified by its first argument, in this case "textfont" to one specified by its second one "geneva".

A Second Format

If the user changes the properties of objects from that shown in FIG. 2*a* to that shown in FIG. 3*a* and does a KEEP BKGND FORMAT, he will get a different gene button script. Table 11 shows the gene script which translates into the properties of the visible buttons shown in FIG. 3*a*. The button PRINT LABEL is specified in statement 76*s*. This was invisible in format 2*a*.

The DIAL OUT button 74 does not appear as it is invisible but the button DOWN 70*s* appears in script as it appears in the format 3*a* as DOWN button 70*v*.

TABLE 11

```
on TRANSLATEBUTTONS --- 2
    set visible of target to true --- 18
    . . . --- 18
    set icon of target to 0 --- 18
    set top of target to 73 --- 18
    set left of target to 172 --- 18
    GeneStart "Btn" --- 24
    nextObj Show, "bg btn id 1360", "Print Label" --1 "332,50,432,72" --- 76s
    set style of target to opaque --- 28
    set width of target to 35 --- 28
    set height of target to 31 --- 28
    set showname of target to false --- 28
    set icon of target to 2730 --- 28
    put 265 into XDELTA --- 30
    put 235 into YDELTA --- 32
    nextObj Show, "Bkgnd btn id 1509", "DOWN" --2 "437,308,472,339" ---70s
    GeneDone Hide --Unspecified Objects Hide,Show or Asls --- 36
end TRANSLATEBUTTONS --- 8
```

Table 12 shows the gene script which translates the properties of the visible fields into the format shown in FIG. 3*a*. This specifies only the fields that shown in format 3*a*.

TABLE 12

```
on TRANSLATEFIELDS --- 2
    set visible of target to true --- 18
    . . . --- 18
    set height of target to 23 --- 18
    set top of target to 117 --- 28
    set left of target to 129 --- 28
    GeneStart "Fld" --- 24
    nextObj Show, "bg fld id 1162", "NAME" --1 "279,117,503,140" --- 50s
    put 0 into XDELTA--- 30
    put 25 into YDELTA--- 32
    nextObj Show, "bg fld id 1196", "TITLE " --2 "279,142,503,165" --- 56s
    nextObj Show, "bg fld id 1197", "COMPANY" --3 "279,167,503,190" --- 54s
```

TABLE 12-continued

```
    nextObj Show, "bg fld id 1198", "ADDRESS1" --4 "279,192,503,215" --- 58s
    set textsize of target to 10 --- 28
    set width of target to 137 --- 28
    nextObj Show, "bg fld id 1199", "ADDRESS2" --5 "279,217,439,240" --- 60s
    set width of target to 89 --- 28
    put 135 into XDELTA--- 30
    put 0 into YDELTA--- 32
    nextObj Show, "bg fld id 1366", "Zip" --6 "439,217,503,240" --- 62s
    GeneDone Hide --Unspecified Objects Hide,Show or AsIs --- 36
end TRANSLATEFIELDS --- 8
```

Flow Charts

FIG. 8 shows a flow chart describing how KEEP BACKGROUND FORMAT works. The first statement 102 creates a card in the stack and copies the background picture and pastes it on that card. It then puts that card's identifier into the global GENEPICTID 103 for use in creating the GENEINFO hander. Next it outputs the handler GENEINFO 104. The compilation of this handler whose output is displayed in Table 2 is straightforward. Next the handler TRANSLATEGENE which actually does the work of reversion and is shown in table 3 is output. Following this the handlers for translating buttons 108, translating fields 110 and translating the configuration 112 are output.

The routine COMPILEHANDLER whose flowchart is in FIG. 9 is called to output TRANSLATEBUTTON or TRANSLATEFIELD. It compiles handlers like those in Table 4, 6, 7, 8, 11, and 12. First it orders the objects of type objtype 116. This step is not necessary and might be a user option. While there are many ways to order objects, ordering them from the upper left hand portion of the screen down to the lower right hand portion is the method used. If the objects are not ordered the second object might be down 40 pixels form the first, and the third object up 20 from the second. It makes the scripts simpler and editing them easier if the second and third objects are reversed so that the new second object is 20 down from the first, and the new third 20 down from the second. The problem is probably not solvable in the optimal case, but an optimal solution is not required. All that is desirable is for ORDER OBJECTS to make a reasonable guess as to a good order to keep scripts short and facilitate their editing. As part of ordering the objects the invisible objects are normally ordered at the end.

Next the compiler outputs "On TRANSLATEFIELD" (or ON TRANSLATEBUTTON) at line 118; this compiles the statement 2 in Table 4. Next all the properties the first object is to have are outputted at line 119; this compiles the statements 18 in table 4. Next GENESTART is output 120; this compiles statement 24. Now it prepares to loop though all the objects of type OBJTYPE by setting the object index to 1 at line 122. In the loop it first compiles a NEXTOBJ statement 124. In table 4 as an example, the first time through the loop it would compile statement 50*s*, then next time 52*s* etc. Next it checks to see if the last object has been output at line 126. If there are still objects to output it increments the object number at line 127. the next box and inner loop at line 128 checks to see if this is an invisible object that should not be output. If only visible objects are to be output and the object i is invisible it loops back to line 126.

In lines 130, 131 and 132 the statements 28 which specify changes in properties from one object to another are compiled. Only two property are specifically referred to in lines 130 and 132 the other properties being suggested by line 131. Line 130 checks to see if the width of object is the same as the current target width. Only if it is different does it compile a statement of the form 28 in table 4. Next all other properties that are differentially specified are similarly compiled in statements 131 and 132. Some special special properties such as order, visible, name, script, left and top may not be differentially specified.

Each property is checked to see if it is changed and if it has, the process is repeated. Then it loops back to compile the next object 124.

When all the objects have been compiled control goes from box 126 to box 134. This compiles a GENEDONE 134 and END TRANSLATEFILED or END TRANSLATEBUTTON 135.

It should be understood that while the description here describes the compilation process as distinct from the graphical editing process, they could occur at the simultaneously. As changes are made in the format using HyperCard on the screen, the system could maintain a gene script which defines its specifications and modify that script incrementally.

When the user executes a gene button script it translates the gene into its format. Except for the handler NEXTOBJ most of the script should be straightforward to understand. FIG. 10 shows how NEXTOBJ works. First it adds DELTAY to the top of the target 136 and DELTAX to the left of the target.

Next it checks to see if the object OBJECT ID actually exists at line 140. It may not as it could have been deleted since the gene was made. If it doesn't exist it might generate a soft error but then exit. It is important that this test occur after 136 and 138 so the next object will be placed where it was rather than where this object would be. Next it sets the objects visibility to that specified by its first argument 142. Next it sets each property (except order, name, and script) to the value that object has in target 148-153. Finally it sets the object's order to NEXTOBJNO 153 which was initialized to 1 and increments NEXTOBJNO 155 and is finished

Porting to Other Stacks

HyperCard provides a mechanism to copy gene buttons from one stack to another. Thus a gene button can be created in one stack and copied to and pasted on another. Such a gene button cannot be used on the destination stack without changes to the scripts to refer to objects in the destination stack in place of objects in the source stack. Once a gene button is copied to another stack it can be used one of two ways:

(a) Parts of its script can be copied into a gene button that was created on the destination stack. Typically initial property specifications such as 18 in table 4 might be copied to override initial specifications in the destination stack. The genetic analogy here is recombination.

(b) The genes can be installed in the new stack. It can be detected as foreign because GENEINFO in table 2 specifies the different source stack it was created on. An attempt to translate a gene on a foreign stack produces an INSTALL ME menu.

An example of what installing a gene in a new stack means is provided in FIGS. 5, 6, 7*a* and 7*b* and its process is shown in the flowchart in Table 11. FIG. 5 shows a different stack, stack B with all its fields and buttons showing. Stack B has three background fields NAME 73*s*, FIRM 75*s* and SOCIAL SECURITY NUMBER 77*s* and one background button CHECK VALIDITY OF SOCIAL SECURITY NUMBER 71*s*. Such a stack could be developed to keep social security numbers and check them for validity, or it could be used to provide an application to be ported to and installed in another stack. Stack A shown in FIG. 2*a* has a field named NAME 50*v* which (we assume) has the same function as 73*v*, and a company 52*v* which has the same function as Firm 75*v*. It however has no SOCIAL SECURITY NUMBER 77*v* field and no CHECK VALID SS NO field 71*v*.

Installing the gene requires searching the gene scripted and any cloned buttons for references to source stack objects and replacing them with references to the appropriate objects on the destination stack. The gene script for stack B shown in FIG. 5 is shown in table 13.

TABLE 13

```
on TRANSLATEFIELDS
    set visible of target to true --- 18
    . . .
    set width of target to 50 --- 18
    set height of target to 40 --- 18
    GeneStart "Fld" --- 24
    nextObj Show, "Bkgnd fld id 2", "Name" --1 "40,50,216,77" --- 73s
    set width of target to 249 --- 28
    set height of target to 28 --- 28
    put 176 into XDELTA ---30
    nextObj Show, "Bkgnd fld id 1", "Firm" --2 "216,50,465,78" --- 75s
    set textalign of target to center --- 28
    set width of target to 315 --- 28
    set height of target to 25 --- 28
    put -131 into XDELTA ---30
    put 51 into YDELTA ---32
    nextObj Show,"Bkgnd fld id 3", "Social Security Number" --3 . . . -- 77s
    GeneDone Hide --Unspecified Objects Hide,Show or AsIs
end TRANSLATEFIELDS
```

The converted and installed script for use in the original name and address stack is shown in table 14 and its graphical representation is shown in FIG. 6. FIG. 6 differs from FIG. 5 in that 50*v* displays the name and 52*v* displays the company that appear in FIGS. 2 through 5. The format shown in FIG. 5 has been ported to the original name and address stack. A new field 79 has been cloned from field 77*s* in FIG. 5 and background button 81*v* has been cloned from 71*v* shown in FIG. 5. The converted gene script for translating the field formats shown in FIG. 6 is shown in table 14.

TABLE 14

```
on TRANSLATEFIELDS
    set visible of target to true --- 18
    . . .
    set top of target to 50 --- 18
    set left of target to 40 --- 18
    GeneStart "Fld" --- 24
    nextObj Show,"Bkgnd fld id 1162", "Name" --1 "40,50,216,77" ---50s
    set width of target to 315 --- 28
    set height of target to 25 --- 28
    put -131 into XDELTA ---30
    put 51 into YDELTA ---32
    nextObj Show,"Bkgnd fld id 1197", "Firm" --2 "216,50,465,78"-- 52s
    set textalign of target to center --- 28
    set width of target to 315 --- 28
    set height of target to 25 --- 28
    put -131 into XDELTA ---30
    put 5 into YDELTA ---32
    nextObj Show,"Bkgnd fld id 1528", "Social Security Number" --3 . . . --- 79s
    GeneDone Hide --Unspecified Objects Hide,Show or AsIs
end TRANSLATEFIELDS
```

A review of the scripts in tables 13 and 14 shows that 3 substitutions have been made. Line 73*s* has been replaced with line 50*s* replacing Bkgnd Fld id 1 with Bkgnd fld id 1162 reflecting the change in the identification numbers for the NAME field in the two stacks; second, line 75*s* has been replaced with line 52*s* replacing Bkgnd Fld id 1 with Bkgnd Field ID 1197 reflecting the different identification number for the FIRM/COMPANY field in the two stacks; third, line 77*s* has been replaced with line 79*s* replacing Bkgnd Fld id 3 with Bkgnd Fld id 1528 specifying a new SOCIAL SECURITY background field which was cloned from the source stack shown in FIG. 5.

Similar substitutions were made in the TRANSLATEBUTTONS. Table 15 shows the TRANSLATE BUTTONS handler in for the format shown in FIG. 5 for stack B, and Table 16 shows the translated handler as is displayed in FIG. 6 for stack A. A review of these scripts will show that line 71*s* has been changed from specifying the "Bg btn id 4" in stack B to "Bg btn id 1527" in stack A.

TABLE 15

```
on TRANSLATEBUTTONS
    set visible of target to true --- 18
    . . .
    set icon of target to 0 --- 18
    set top of target to 174 --- 18
    set left of target to 167 --- 18
    GeneStart "Btn" -- 24
    nextObj Show,"Bg btn id 4", "Check Valid SS No." --1 "167,174,349,198" --
71s
    GeneDone Hide --Unspecified Objects Hide,Show or AsIs
end TRANSLATEBUTTONS
```

TABLE 16

```
on TRANSLATEBUTTONS
    set visible of target to true --- 18
    . . . --- 18
    set icon of target to 0 --- 18
    set top of target to 174 --- 18
    set left of target to 167 --- 18
    GeneStart "Btn" -- 24
    nextObj Show,"Bg btn id 1527", "Check Valid SS No."--. . . -- 81s
    GeneDone Hide --Unspecified Objects Hide,Show or AsIs
end TRANSLATEBUTTONS
```

The original CHECK VALID SS NO button 71*v* script is shown in table 17.

TABLE 17

```
on mouseUp
    put line 1 of bkgnd fld id 3 into no --- 200
    . . .
end mouseUp
```

The CHECK VALID SS NO button script 81*v* as ported to the stack A is shown in table 18.

TABLE 18

```
on mouseUp
    put line 1 of bkgnd fld id 1609 into no ---202
    . . .
end mouseUp
```

Here "bkgnd fld id 3" at 200 in table 17 is replaced with bkgnd fld id 1609 at 202 in table 18.

Installing the gene for the format of stack B shown in FIG. 6 into stack A shown in FIG. 5 consists of copying the gene, pasting it and installing it. This will cause the script in table 13 for stack B to be changed to the script in table 14 for stack A and the script in table 17 for stack B to be changed to the script in table 18 for stack A.

The flowchart in FIG. 11 shows how this occurs. The installation process constructs two lists. One is called PAIRLIST and consists up a list of pairs of current, source stack (e.g. B) IDs and new destination stack (e.g. A) IDs. The format could be: (a1, b1),(a2, b2), . . . ). CLONELIST is a list of all of the objects (such as SOCIAL SECURITY NO.) that are cloned from the source stack to the object stack. To convert a button, gene or other script from its source stack form to its destination stack form, all source stack object identifiers (a1, a2 . . . ) are replaced with the corresponding destination stack identifiers (b1, b2 . . . ).

When a user selects an uninstalled gene, it presents him with a limited menu which includes INSTALL ME Selecting INSTALL ME initiates the procedure shown in the flow chart in FIG. 11. First at 157, PAIRLIST is set to empty. Next the program loops through each line of the genes script at 158. For each line it asks if it contains "NEXTOBJ" which would specify an object to be output at 160. If not, it loops to box 178 which increments the scripts line number. Otherwise it sets SRCID to the ID of the object NEXTOBJ would translate at 162, as indicated at 92 in table 5. Next the user is presented with four options as to what to do with that object referenced in the gene script at 164. The options are:

CLONE the object 168: The object is copied from the source stack to the destination stack, complete with script and name. 79*v* in FIG. 6 stack A was cloned from 77*v* in FIG. 5 stack B; and 81*v* in FIG. 6 was cloned from 71*v* in FIG. 5. (The script changes for these formats are shown in tables 13 and 14). The id HyperCard gives the destination stack object is put in DESTID 170. Next DESTID is appended to PORTLIST so its script can be converted to the destination stack object identifiers 171. From here control rejoins the other three options at 177.

USENAME: this option only occurs if there exists an object in the destination stack with the same name as the object in the source stack 172. The object's name appears in the NEXTOBJ statement as shown in 93 in table 5. If the user chooses this option, DESTID is set to the id of the object in the destination stack that has that name in the source stack. An example of this is the object NAME, 73*v* in FIG. 5 which was converted to 50*v* in FIG. 6. Control resumes at 177.

FINDNAME: this option lets the user select a destination stack object to use at 174. The user could specify the object by id, name or the program could prompt the user. The id of whatever object is chosen is put in DESTID. An example is FIRM 75*v* in FIG. 5 which is replaced by COMPANY 52*v* in FIG. 6. Control resumes at 177.

IGNORE: This option is used if the user does not want to use to the object 176. If NEXTOBJ has a nonexistent object as an argument it behaves as if it was not called (except to give a soft error). Control resumes at 177.

The above four options are joined at 177 where the new pair SRCID and DESTID are added to PAIRLIST.

Next the scripts line number is incremented at 178. If it is not the last line, control goes back to the beginning of the loop 158. If it is the last line in the script, REPLACEIDS 178 uses the list CLONELIST to replace all references to the source stack objects with references to just determined destination stack equivalents. It does this in the gene script and all the scripts in PAIRLIST.

Once the user has ported a format to a new stack as from FIG. 5 to FIG. 6, he can use it as is. To integrate the ported function into the destination stack the user can a) Translate the stack to the format *2a*. This will of course make the button 81*v* and and field 79*v* invisible, b) Make the ported objects visible either (a) by using HyperTalk commands, or creating a new gene script for the FIG. *2a* format which shows invisible objects, editing the 81*v* and 79*v* to make them visible, and translating the script. The result is displayed in FIG. *7a*.

c) Edit the background using Hypercard commands to make a more finished presentation. The result is shown in FIG. *7b*.

Card Formats

As described in the beginning, HyperCard cards can have formats with their own buttons, fields and pictures. The capability described here is equally applicable to support cards involving the same methodology. Porting formats from one card to another is no different than porting from one stack to another. Similarly formats can be ported from cards to stacks or from stacks to cards.

METHOD OF OPERATION

The system appears as 5 menu items added to HyperCard's menu bar and as a gene buttons 88 with a graphical image that identifies them as gene buttons. These gene buttons appear on the surface of the card or background and contain the gene scripts for creating the formats. Gene buttons are shown at 88 in FIG. *2c*.

The five menu items are:

KEEP BACKGROUND FORMAT complies a gene script into a background gene button called TRANSLATEBKGND. This is what was described in detail here.

TRANSLATE BACKGROUND FORMAT translates the gene button TRANSLATEBKGND. This translates the most recently saved background format.

KEEP CARD FORMAT complies a gene script into a card gene button called TRANSLATECARD.

TRANSLATE CARD FORMAT translates the gene button TRANSLATECARD. This translates the most recently saved card format.

SHOW GENES toggles the display of the gene buttons 88 on and off between the formats shown in FIG. *2a* and FIG. *2c*. When creating and modifying genes, it is useful to have the gene buttons visible; but they are best left off in normal use.

If the user selects a gene with a mouse and depresses the mouse button, he will be presented with a menu of options:

TRANSLATE GENE translates the gene so its format is realized on the screen. It calls the handlers to translate the fields, buttons, picture and configuration.

TRANSLATE FIELDS translates the field properties by executing the TRANSLATEFIELDS handler.

TRANSLATE BUTTONS translates the button properties by executing the TRANSLATEBUTTONS handler.

TRANSLATE PICTURE translates to the saved background picture specified by GENEPICTID.

TRANSLATE CONFIGURATION translates to the saved global configuration variables.

COPY GENE copies the gene button to a buffer from which it can be pasted to another stack. (It is just HyperCard's Copy button command.)

CLONE ME makes a copy of itself and asks for a name. This is the mechanism to save multiple formats as the present implementation of KEEP BACKGROUND FORMAT puts the gene in TRANSLATEBKGND, rather than asking the user for a name of a gene to store it in.

EDIT ME lets the user edit the gene script.

The normal operation is for the user to create a background format, then use the KEEP BACKGROUND FORMAT COMMAND to save it on the gene button TRANSLATEBKGND, and then to select that button and use the CLONE ME command to make a named copy. As the user repeatedly does this, he will build up a library of different genes for different formats and by selecting any one and executing the TRANSLATE GENE COMMAND he can translate to that format.

A menu called FORMAT menu has been added to HyperCard's menu bar and lists all of the background genes. This is more natural for use as a finished applications than is gene selection. If each gene specifies an application, then the format menu is an application selector for that stack.

In normal operation the user will modify the background objects, do KEEP BACKGROUND FORMAT commands followed by editing the saved gene script followed by translating it. Often the user will cycle through this process two or three times until a format proves acceptable and he will then use a CLONE ME command to give it a name and save it.

Much of the power of the invention comes from the multiplicity of tasks it is useful for. Here we separate its uses into three categories: (a) as a single format system, (b) as a multiple format system for a single stack and (c) as a mechanism to port formats from one stack to another. As a single format system The user can KEEP BACKGROUND FORMAT and then change the format. But translating the gene he restores the original format.

1. This provides an UNDO capability, letting the user try (but not save) new formats undo changes he made.

2. This lets the user modify the format in a script form as well as a visual image form. While the visual image form us usually better for gross layout, a script form is often better for fine tuning the image. Some properties (e.g. visible) cannot be changed graphically and the script provides a means for making the values of these properties visible and for changing those properties. While it is always possible to write from scratch a script that will do what the user wants, this requires both effort and knowledge. The ability to automatically get a script that is close to what the user wants is valuable as a much large number of people are likely to be able to recognize what is not right and fix it, then would be able to write a program in the first place.

3. Often objects get too small, are invisible or go off screen, and are difficult to find. The gene script makes it easy to find them. 4. The script is compiled to specify only property differences. This has the advantage that user can often make global changes by changing a single word. Graphical editing makes it difficult to create uniform buttons and fields—ones with the same dimensions spaced evenly apart, but editing a gene script to delete program statements which specify the slightly different properties both simplifies the script and makes the graphical form uniform when the gene is translated.

As Multiple Gene Formats

The ability to save alternative formats in gene scripts allows the user to switch between different formats for the same stack. This is useful for:

1. Building and testing different user interfaces to see which is best. In the simplest form the interfaces differ in only the arrangement of the buttons. However, where interfaces differ in just some of their capability, the gene metaphor naturally supports both the common parts and unique part of the applications.

2. Different formats can be geared to different skill levels of users. Typically novice formats will have fewer visible objects and applications and might have more helpful application scripts, while expert formats would have more visible objects, more applications, and less unwanted help in executing the application.

3. Different formats can implement very different applications built on the same data base. For example a name and address stack might have a phone and address format, a print label format and a mail merge format. By switching between these different formats the user switches between applications.

4. Users and developers can keep genes for earlier versions of applications and add new objects or copy and modify exiting ones to created updated versions. This allows the users and developers to enter the risky area of change with the ability to translate to earlier versions.

(a) It lets users add new buttons and fields without worrying about their effect on existing formats. With conventional methods, the developer would have to go into the existing programs, understand them and modify them to add the new capability with the real possibility of creating bugs. Here, the user just reformats the stack and adds any needed new buttons (with their application scripts) and fields and saves the new format.

(b) If the user does not modify existing scripts but only adds new ones then if new format's application proves buggy, the user can translate to an old format which should work as before.

Multiple Stack Uses

Users can copy gene buttons from one stack to another (or one card to another, or between cards and stacks):

1. Users can Copy formats from one stack and install or inject them into another stack. This could be used to copy a label printer, dial out, or other more complex script from one stack to another.

2. Users can create hybrid formats consisting of parts of different stack formats, some of which have been imported from other stacks.

3. Porting genes to other stacks is a way to synchronize formats. If a user has many stacks or cards should have the same format the gene metaphor provides three methods for doing it:

(a) Port genes to the new stack. This works best where most of the objects in the source stack have analogies in the destination stack.

(b) Edit genetic material from one stacks gene to another. This is often useful if the major changes are to global parameters or a few objects.

c) Insert a new handler to intercept GENESTART and redefine the initial parameters. This is particularly useful in giving a similar look to a large number of cards.

4. Often a stack may originate with a person or organization and be used to several other persons, if each person makes his own modifications to his version of the stack, are two potential problems exist which are solved by the gene metaphor:

The originator wants to distributed a new version that contains new functional capability and users want to install it in his own stack and yet still be able to keep his own custom buttons, script and format: In this case the user can install the new gene to get the new format and still translate to his existing formats. Furthermore, the user can create new formats which combine the capabilities in the custom genes with those of updated ported gene format.

5. If the newly delivered stack is an updated data base (rather than new functional capability), but the user has special custom formats, the user can port his custom formats to the new stack.

CONCLUSION RAMIFICATIONS AND SCOPE OF THE INVENTION

While this invention is described in the context of HyperCard because it is implemented there and HyperCard is widely available, its use is much broader than that. It can be used in any system consisting of components that have a visual representation where it is desirable to view different arrangements of different component subsets.

While the invention uses the concept of program scripts as part of object buttons, these scripts could just as easily be macros of a series of keystroke actions or as of menus.

What is claimed is:

1. In a computing device, including a display device capable of displaying a plurality of objects at one time, an input device, a data storage device for storing data, a processor responsive to said input device for accepting data and also responsive to stored programs, the improvement comprising:

first program means for controlling the visual appearance of an object on the display device, the object having associated therewith a first set of attributes, said first set of attributes defining the appearance of said object;

means for selecting said object and thereby executing a program unique to said object;

second program means for selectively storing in a first location of said data storage device the first set of attributes associated with said object;

first input means responsive to commands from said input device for changing at least one attribute of the first set of attributes to form a second set of attributes whereby the visual appearance of said object is changed;

third program means for selectively storing in a second location in said data storage device the second set of attributes associated with said object; and, second input means for translating said object to the visual appearance obtained with said first set of attributes, said second input means responsive to said input device and said first set of attributes stored in said first location of said data storage device whereby by a simple input command restore a previous set of attributes.

2. The device of claim 1 wherein the first set of attributes further defines the location of said object on said display device.

3. The device of claim 1 wherein the first set of attributes further defines whether the said object will be visually apparent on said display device.

4. The device of claim 1 wherein the second program means includes means to edit the said object graphically.

5. The device of claim 1 wherein the second program means includes means to modify the first set of attributes in the first program means.

6. In a computing device, including a display device capable of displaying a plurality of objects at one time, an input device, a data storage device for storing data, a processor responsive to said input device for accepting data and also responsive to stored programs, the improvement comprising:

means for selecting said object and thereby executing a program unique to said object;

first program means for simultaneously controlling the visual appearance of several objects in a first arrangement on the display device each of the objects having associated therewith a unique first set of attributes, said unique first set of attributes defining the appearance of said object;

second program means for selectively storing in a first location of said data storage device the unique first set of attributes associated with each of said objects;

first input means responsive to commands for said input device for changing at least one attribute of the unique first set of attributes of at least one object to form a second set of attributes whereby the visual appearance of said at least one object is changed to a second arrangement;

third program means for selectively storing in a different location of said data storage device the second set of attributes associated with said at least one object and for storing the unchanged unique first set of attributes in conjunction with the second set of attributes and, second input means for translating the said at least one object to the visual appearance obtained with said unique first set of attributes said means responsive to said input device and said first set of attributes stored in said first location of said data storage device.

7. The improvement of claim 6 wherein the unique first set of attributes further determines the locations of said objects on said display device.

8. The improvement of claim 7 wherein the unique set of attributes determining the location of a first object on said display device is defined relative to a predetermined position on said display device, and further wherein the unique set of attributes determining the location of a second object on said display device is defined relative to said first object, and means to edit said second program means such that if an attribute of two successive objects have the same value the second object is not presented for editing.

9. The improvement of claim 6 further including means for copying the second set of attributes and the unchanged first set of attributes, and further wherein said first program means controls the visual display of said objects in said second arrangement in accord with said second set of attributes and in conjunction with said first set of attributes.

10. The improvement of claim 9 further including means for indicating on each of said first and second arrangement the presence of two sets of attributes for defining the visual appearance of said objects in either of said first or said second arrangement.

11. The improvement of claim 10 wherein each of said objects has associated with its first and second set of attributes an identifier; the improvement including name means for simultaneously changing said identifier associated with both said first and second set of attributes upon changing the identifier associated with one of said sets of attributes by commands received from said first input device.

12. The improvement of claim 6 wherein the unique first set of attributes further defines whether said object will be visually apparent on said display device.

13. The improvement of claim 12 wherein the unique first set of attributes further determines the locations of said objects on said display device.

14. The improvement of claim 13 wherein the unique set of attributes determining the location of the first object on a display device is defined relative to a predetermined position on said device, and further where the unique set of attributes determining the location of a second object on said display device is defined relative to said first object, and means to edit said second means such that if an attribute of two successive objects have the same value the second object is not presented for editing.

15. The improvement of claim 14 further including means for copying the second set of attributes and the unchanged first set of attributes, and further wherein said first program means will control the visual display of said objects in said second arrangement in accord with said second set of attributes and in conjunction with said first set of attributes.

16. The improvement of claim 15 further including means for indicating on each of said first and second arrangements the presence of two sets of attributes for defining the visual appearance of said objects in either of said first or said second arrangements.

17. A computing system for simultaneously controlling the display of a plurality of objects on a display device, the system comprising:

a display device;

an input device;

a data storage device;

a processor responsive to said input device for accepting data and further responsive to store program;

means for selecting said object and thereby executing a program unique to said object;

first program means for simultaneously controlling the visual appearance of several objects on a first arrangement on the display device each of the objects having associated therewith a unique first set of attributes, said unique first set of attributes defining the appearance of each of said objects;

second program means for selectively storing in a first location of said data storage device the unique first set of attributes associated with each of said objects;

first input means responsive to commands from said input device for changing at least one attribute of the unique first set of attributes of at least one object to form a second set of attributes whereby the visual appearance of said at least one object is changed to a second arrangement;

third program means for selectively storing in a second location of said storage device the second set of attributes associated with said at least one object and for storing the unchanged unique first set of attributes in conjunction with the second set of attributes; and, second input means responsive to said input device for translating the said at least one object to the visual appearance obtained with said unique first set of attributes.

18. The improvement of claim 17 wherein the unique first set of attributes further determines the locations of said objects on said display device.

19. The improvement of claim 18 wherein the unique set of attributes determining the location of a first object on a display device is defined relative to a predetermined position on said device and further wherein the unique set of attributes determining the location of a second object on said display device is defined relative to said first object, and means to edit said second program means such that if an attribute of two successive objects have the same value the second object is not presented for editing.

20. .The improvement of claim 18 further including means for copying the second set of attributes and the unchanged first set of attributes, and further wherein said first program means will control the visual display of said objects in said second arrangement in accord with said second set of attributes in conjunction with said first set of attributes.

* * * * *